(12) United States Patent
Werner et al.

(10) Patent No.: US 10,773,545 B2
(45) Date of Patent: Sep. 15, 2020

(54) VEHICLE WHEEL HAVING A CONNECTION OF A WHEEL RIM WITH RIM BASE MADE FROM FIBER COMPOSITE MATERIAL AND A WHEEL DISC

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); André Bartsch, Dresden (DE); Michael Dressler, Dresden (DE); Sandro Maeke, Dohma (DE); Christian Heilmann, Dresden (DE); Florian Franke, Dresden (DE)

(73) Assignee: THYSSENKRUPP CARBON COMPONENTS GMBH, Wilsdruff STT Kesselsdorf (DE)

( * ) Notice: Subject to any disclaimer, the term of this patent is extended or adjusted under 35 U.S.C. 154(b) by 528 days.

(21) Appl. No.: 15/109,888

(22) PCT Filed: Jan. 14, 2015

(86) PCT No.: PCT/DE2015/100019
§ 371 (c)(1),
(2) Date: Jul. 6, 2016

(87) PCT Pub. No.: WO2015/106760
PCT Pub. Date: Jul. 23, 2015

(65) Prior Publication Data
US 2016/0325582 A1 Nov. 10, 2016

(30) Foreign Application Priority Data
Jan. 15, 2014 (DE) .................. 10 2014 100 428

(51) Int. Cl.
*B60B 3/04* (2006.01)
*B60B 5/02* (2006.01)
(Continued)

(52) U.S. Cl.
CPC ............... *B60B 3/041* (2013.01); *B60B 3/10* (2013.01); *B60B 5/02* (2013.01); *B60B 21/12* (2013.01); *B60B 23/06* (2013.01); *B60B 1/14* (2013.01)

(58) Field of Classification Search
CPC ..................................................... B60B 3/04; B60B 3/041; B60B 3/042; B60B 3/044; B60B 3/045; B60B 3/047;
(Continued)

(56) References Cited

U.S. PATENT DOCUMENTS 3,008,770 A 11/1961 Mueller
3,346,301 A * 10/1967 Hurst, Jr. .................. B60B 1/08
29/525.06
(Continued)

FOREIGN PATENT DOCUMENTS

CN 1867463 A 11/2006
CN 101054049 A 10/2007
(Continued)

*Primary Examiner* — Kip T Kotter
(74) *Attorney, Agent, or Firm* — thyssenkrupp North America, LLC

(57) ABSTRACT

A vehicle wheel comprising a wheel rim with a rim base made from fiber composite material and a wheel disc. The wheel disc is connected to the wheel rim by a connecting element which is guided through a passage of the rim base and is received in the wheel disc. The wheel rim comprises a connecting arrangement with at least one connecting element and a seal element which covers in a complete and hollow manner a part of one or more adjacent connecting arrangements that extends across the rim outer side of the rim base. A circumferential edge of the seal element is glued in air-tight manner to the rim well. Alternatively, the wheel (Continued)

rim comprises a connecting arrangement with a connecting element and a flexible sealing layer made from plastic and completely covers, by coating, a part of the connecting arrangement which extends over the rim outer side of the rim base. An edge region of the flexible seal layer is connected in an air-tight manner to the rim base.

19 Claims, 12 Drawing Sheets

(51) Int. Cl.
  *B60B 21/12* (2006.01)
  *B60B 23/06* (2006.01)
  *B60B 3/10* (2006.01)
  *B60B 1/14* (2006.01)
(58) Field of Classification Search
  CPC .................................................. B60B 21/12;
    B60B 25/22; B60B 1/14; B60B 5/02;
    B60B 23/08; B60B 3/10
  See application file for complete search history.

(56) References Cited

U.S. PATENT DOCUMENTS

| | | | |
|---|---|---|---|
| 3,507,316 A * | 4/1970 | Jaulmes | B60L 321/062 |
| | | | 152/381.3 |
| 4,108,232 A | 8/1978 | Simpson | |
| 4,150,854 A | 4/1979 | Lohmeyer | |
| 4,153,267 A * | 5/1979 | Hilber | B60B 1/08 |
| | | | 280/281.1 |
| 4,518,204 A | 5/1985 | Takada | |
| 4,824,177 A * | 4/1989 | Aloy | B60L 31/003 |
| | | | 152/384 |
| 6,019,149 A * | 2/2000 | Stringer | B60B 21/12 |
| | | | 152/381.5 |
| 7,487,811 B2 * | 2/2009 | Schelhaas | B60L 31/041 |
| | | | 152/381.5 |
| 7,918,513 B2 * | 4/2011 | Wilson | B60B 1/06 |
| | | | 301/64.101 |
| 2004/0021365 A1 * | 2/2004 | Georgeff | B60L 33/002 |
| | | | 301/11.2 |
| 2004/0095014 A1 * | 5/2004 | Veux | B60L 321/025 |
| | | | 301/58 |
| 2008/0048489 A1 * | 2/2008 | Liu | B60L 31/041 |
| | | | 301/61 |
| 2008/0143171 A1 | 6/2008 | Wilson | |
| 2012/0235467 A1 * | 9/2012 | Tho | B60L 321/062 |
| | | | 301/95.11 |
| 2015/0273934 A1 * | 10/2015 | Huidekoper | B60B 5/02 |
| | | | 301/11.1 |
| 2015/0352897 A1 * | 12/2015 | Huidekoper | B60B 5/02 |
| | | | 301/11.1 |

FOREIGN PATENT DOCUMENTS

| | | | | |
|---|---|---|---|---|
| CN | 101218110 A | | 7/2008 | |
| DE | 3422588 A1 | | 12/1985 | |
| DE | 29902868 U1 | | 4/1999 | |
| DE | 102006039686 A1 | | 2/2008 | |
| DE | 102007023220 A1 | * | 11/2008 | ............ B60B 1/041 |
| EP | 0014097 A1 | * | 8/1980 | ............ B60B 21/12 |
| EP | 1249355 A1 | | 10/2002 | |
| EP | 1619043 A2 | | 1/2006 | |
| EP | 1858715 B1 | | 11/2007 | |
| JP | 61054302 A | * | 3/1986 | ............ B60B 21/12 |
| WO | 2010067383 A | | 6/2010 | |
| WO | WO-2012007991 A1 | * | 1/2012 | ............ B60B 1/047 |

\* cited by examiner

VEHICLE WHEEL HAVING A CONNECTION OF A WHEEL RIM WITH RIM BASE MADE FROM FIBER COMPOSITE MATERIAL AND A WHEEL DISC

BACKGROUND OF THE INVENTION

1. Field of the Invention

The invention relates to a vehicle wheel, which has a wheel rim with a rim base made from fiber composite material and a wheel disc, whereby the wheel disc is connected to the wheel rim by means of at least one connecting element, which is guided through a passage of the rim base and is received by the wheel disc.

2. Discussion of Background Information

The wheel disc may have a bowl-shaped, closed or star-shaped open structure.

A device of this type is known from printed publication EP 1 858 715 B1. With this vehicle wheel, a star-shaped wheel disc (wheel spider) is connected to the rim by means of several connecting elements which may be bolts or rivets and in each case lead through—in each case—one clearance hole in the rim base. The connection penetrating the rim base is not visible from the rim inner side. For the purpose of sealing (off) against the pressure chamber of the rim, a seal, especially a sealing compound, is provided between the connecting element and the rim base or in the clearance hole of the rim base.

The wheel spider and the connecting element are directly attached to the rim base, which with most material pairings and when subjected to the dynamic load during operation of the vehicle wheel, causes vibratory-rubbing wear to the material of the rim base. Owing to the differing rigidity situations of the connecting element, wheel spider and rim base, intense relative movements are to be expected during operation in relation to one another.

As a result of this, problems arise with regard to the leak tightness of the connection, because the differing rigidity situations and micro-movements of the components considerably reduce the sealing effect of the connection when subjected to the continuous load. During deformations of the wheel spider, e.g. when the vehicle drives over a kerb or a pothole, particularly high forces are transferred to the connection and the seal, which further exacerbate the leaks. The connecting element and the sealing compound are connected to the pressure chamber of the rim, so that any leak inevitably leads to a loss of pressure in the tire and thereby constitutes an accident risk.

It is also disadvantageous that the—in particularly visco-plastic—nature of the seal tends, during the contact pressure and the micro-movements, towards severe creep and thereby reduces the load-carrying capacity of the connection, which can lead to the connection loosening or even becoming undone.

The task underlying the invention is to eliminate the disadvantages of the vehicle wheel according to the prior art and in particular to provide a reliable and operationally safe connection of the wheel rim to the wheel disc.

SUMMARY OF THE INVENTION

The tasks is, in accordance with the invention, solved by the wheel rim having, for connection to the wheel disc, at least one connecting arrangement with at least one connecting element and, for sealing vis-à-vis the tire chamber, a sealing element which in a complete and hollow manner covers a part of one or more adjacent connecting arrangements which part extends across the rim outer side and by a circumferential edge of the sealing element being glued in an air-tight manner to the rim base.

The sealing element according to the invention covers and completely surrounds the part of the connecting arrangement that contacts with the rim outer side of the wheel rim on the rim base or is enclosed in the rim base on the rim outer side, whereby the covering sealing element with a defined, stable geometry forms a cavity above the part of the connecting arrangement that extends on the rim outer side and only an edge of the sealing element is glued to the rim base.

The sealing element is designed or supported in such a dimensionally stable way that it essentially retains its geometry when subjected to the impact of the pressure of the tire chamber.

The connecting element of the connecting arrangement may for example be a bolt or rivet penetrating the rim base; accordingly the part of the connecting arrangement extending across the rim outer side can be a bolt or rivet head.

The connecting arrangement may comprise several combined connecting elements and additional elements of the connection, for example bushing components or a washer underneath the bolt head, whereupon these elements of the connection may also have a part of the connecting arrangement that extends across the rim outer side, which according to the invention is completely covered and surrounded by the sealing element.

The rim outer side is the side of the rim facing away from the wheel disc. In a peripheral area around the part of the connecting arrangement that extends on the rim outer side, the circumferential edge of the sealing element contacts with the rim base and is glued to the latter, whereby this directly seals off the sealing element against the rim base. The seal may e.g be formed through an adhesive connection between the peripheral inner surface of the sealing element and the rim base and/or through an adhesive connection between the peripheral outer surface and the rim base, for example through an overlapping coating of the edge or of the entire sealing element that extends onto the rim base with an adhesive, sealing layer. In any event, the direct or indirect gluing of the sealing element to the rim base is decoupled from the connecting arrangement that subjected to a mechanical load and ensures a secure and stable sealing effect.

Thereby the pressurized tire chamber of the wheel rim which is located on the rim outer side is fully sealed off from the connecting arrangement, including the connecting element penetrating the passage, and separated from the external atmosphere.

If, for the purpose of connecting the wheel rim to, for example, a star-shaped wheel disc, several connecting arrangements are arranged adjacently in a group, the sealing element can cover and enclose, in a hollow manner, the parts of these grouped connecting arrangements that extend across the rim outer side. In the manner previously described, the connecting arrangements arranged in a group can be sealed in their entirety with one single sealing element thereby saving on materials and space.

The invention assumes that the main flow of force for transmitting the forces from the wheel disc into the wheel rim is via the direct frictional locking between the wheel disc, the connecting element and additional parts of the connection incorporated in a force-fit manner, and the rim base.

With the arrangement and design of the seal according to the invention, the sealing element required for the leak tightness of the force-fit connecting arrangement is located outside of this flow of force. The sealing element is thus spared the contact pressure of the connecting element against the rim base and decoupled from the relative movements of the mechanical connection occurring between the connecting arrangement, the rim base and the wheel spider during operation of the vehicle wheel.

The material of the sealing element is thereby protected from creep and wear under the mechanical stress of the force-fit connecting arrangement. The sealing element retains its sealing effect long term.

The wheel rim of the vehicle wheel must withstand overpressures of up to 8 bar in the tire chamber. Accordingly there are high demands on the air tightness of the rim base made of fiber composite material and on the connection penetrating the rim base, which are optimally fulfilled by the dimensionally stable design according to the invention and independent arrangement of the covering sealing element on the rim base.

With the inventive arrangement and design of the sealing element, a self-sealing effect of the connecting arrangement is additionally achieved. The more pressure originating from the pressurized tire chamber of the wheel rim, the better the pressing of the sealing element against the rim base and thereby its sealing effect becomes.

Even with misuse loads, which are associated with damage to the connecting element or other parts of the connecting arrangement or breakage of spoke components of the wheel disc, the sealing effect is preserved. Risks of accidents through a sudden drop in pressure via the connecting arrangement are thereby, for the most part, eliminated.

As a result, a particularly reliable and operationally safe connecting arrangement with a functionally secure seal is achieved.

The task is also solved in accordance with the invention by the wheel rim having at least one connecting arrangement with at least one connecting element and also a flexible sealing layer made of a preferably viscoplastic plastic which, by means of coating, fully covers a part of one or more adjacent connecting arrangements that extend across the rim outer side of the rim base, and by a peripheral area of the flexible sealing layer being connected in an air-tight manner to the rim base.

The flexible sealing layer is a rubbery layer with a pronounced layer thickness made of elastic material, preferably of viscoplastic plastic e.g. in the form of a thick coating layer, which is applied at least partially in the area of the part of the connecting arrangement that extends across the rim outer side of the rim base and completely covers this. A peripheral area of the flexible sealing layer overlaps the part of the connecting arrangement that extends across the rim outer side of the rim base and is connected with the surrounding rim base so as to seal it.

The flexible sealing layer can also cover, collectively, several grouped connection arrangements that extend across the rim outer side and seal them off in an assembly, which makes things easier from a technological point of view and provides large sealing surfaces for a particularly secure seal.

This embodiment of the invention is easy to produce and is particularly suitable with wheel constructions with not very pronounced micro-movements in the connecting arrangement, which can be accommodated and compensated for well by the rubbery layer.

This solution, too, is associated with the previously described advantages, and a particularly reliable and operationally safe connecting arrangement with a functionally secure seal is achieved.

Advantageous embodiments and developments of the invention are apparent from the dependent patent claims, the subsequent description and the associated drawings.

One advantageous embodiment provides that the edge of the sealing element or the peripheral area of the flexible sealing layer is glued to a layer, made of preferably viscoplastic plastic, that seals the rim base. The sealing element or the flexible sealing layer is, in a peripheral area around the part of the connection arrangement that extends on the rim outer side of the rim base, connected to an adhesive and sealing layer of the rim base, which is frequently applied to the rim outer side of the rim base made of fiber composite material to increase the leak tightness of the rim base made of fiber composite material. The gluing of the peripheral area of the sealing element or the flexible sealing layer may take place overlapping or directly with the rim base, whereby here, too, the sealing (off) is decoupled from the mechanically stressed connecting arrangement and ensures a secure and stable sealing effect.

A further advantageous design provides that the sealing element or the flexible sealing layer is completely covered by a layer, made preferably of viscoplastic plastic, that seals the rim base.

Here, no explicit gluing of the sealing elements or of the flexible sealing layers in the peripheral area around the part of the connecting arrangement that extends on the rim outer side with the rim base is needed. The sealing elements or the partially applied flexible sealing layers are fixed using the air-tight sealing layer provided on the rim outer side of the rim base and at the same time sealed off against the rim base, whereby a full all-over sealing layer forms across the entire rim base. The sealing layer, preferably made of a viscoplastic plastic, has particularly good adhesive and sealing properties and is therefore well suited to adhesion in the peripheral area of the sealing element or the flexible sealing layer. This design saves the production step of the separate, sealing glued connections between the individual sealing elements or flexible sealing layers with the rim base.

Advantageously, the flexible sealing layer is simultaneously a layer sealing the rim base. With this design, the flexible sealing layer above the connecting arrangement is integrated in an easy-to-produce and cost-efficient manner into the sealing layer which is frequently provided anyway on the rim outer side of the rim base made of fiber composite material. The sealing lacquer used can be partially, in the area of the part of the connecting arrangement that extends across the rim outer side, designed so as to have a correspondingly pronounced layer thickness, whereby it has particularly viscoplastic properties and is therefore well suited as a flexible sealing layer.

According to a particularly advantageous embodiment, the connecting arrangement has at least one bushing component, in which the connecting element is guided. Through the use of a preferably metallic or ceramic bushing component, which at least partially encloses the passage through the rim base made of fiber composite material, the vibratory-rubbing wear between the connecting element and the fiber structure of the rim base is reduced on a long-term basis and the operational safety of the connection further improved.

The invention assumes here that with the connecting arrangements penetrating the rim base in accordance with the prior art, the use of bushings is particularly difficult in terms of the quality assurance of the leak tightness. For example, the pressure-tightness between the moving parts, such as the bushing components and the connecting element, and also against the rim base, is very complicated and costly to produce. These required multiple seals have hampered the design of the connection between the wheel rim and the wheel disc by means of bushing systems for cost reasons. In addition, a high susceptibility to faults of the necessary multiple seals arises, particularly if several connections are usually provided for attaching the wheel disc.

The inventive arrangement and design of the sealing element or the flexible sealing layer in relation to the connecting arrangement solves these problems. Through the sealing element, which covers the connecting arrangement in its entirety on the rim outer side, or through the flexible sealing layer, complete sealing (off) of the connecting arrangement including the bushing(s) against the air pressure of the tire chamber and the rim base is achieved and costly seals of the bushing components against each another, against the connecting element and against the rim base become unnecessary. Meanwhile, a stable and functionally secure pressure tightness of the entire connecting arrangement is achieved. A cost-effective, secure connection involving reduced vibratory-rubbing wear with simultaneously reliable seal tightness is made available.

Advantageously, an outer bushing component of the connecting arrangement has a flange collar that extends across the rim outer side.

The flange collar that is in contact with the rim outer side improves the introduction of forces and distribution of the contact pressure of the connecting element with the rim base made of fiber composite material and hence provides greater protection of the fiber structure of the rim base under the continuous load of the mechanical connection.

The sealing element or the flexible sealing layer is, in this case, connected in an air-tight manner to the rim base in the peripheral area around the flange collar that is in contact with the rim outer side.

In this context it is also advantageous if the outer bushing component or the flange collar has a corresponding contact surface for the seating of the connecting element or the part of the connecting element that extends across the rim outer side, whereby particularly good guiding of the connecting element and a homogeneous distribution of the forces introduced into the rim base is provided.

In accordance with an advantageous embodiment of the invention it is provided that the part of the connecting element that extends across the rim outer side, for example the head of the connecting element and/or the outer bushing component and/or its flange collar is arranged in a recess of the rim outer side of the rim base.

The recess can be at least one flat, level milled-out portion in a curved surface of the rim outer side in the area of the part of the connecting arrangement that extends across the rim outer side, which ensures an improved contact between the parts of the connecting arrangement on the rim outer side and the surface of the rim base.

With a correspondingly designed recess it is also possible for the part of the connecting arrangement that extends across the rim outer side to be designed either with a particularly flat protrusion above the surface of the rim outer side or be flush with the surface of the rim outer side or even form a well in relation to the surface of the rim outer side.

A recessed arrangement of the connecting arrangement makes it possible to design the covering sealing element to be mostly flat, without any significant elevation in relation to the rim outer side, whereby, however, the covering—in a hollow manner—of the part of the connecting arrangement that extends across the rim outer side can be ensured. The flat design of the sealing element above the recessed connecting arrangement facilitates the mounting of the tire onto the wheel rim, during which the tire must be pulled over the contour of the rim base or the rim outer side and of the sealing elements to the tire seating. This sealing design reduces geometric obstructions when fitting the tire onto the rim base.

With a further advantageous embodiment, the covering sealing element is also arranged in a recess of the rim outer side of the rim base.

The recess may be at least one flat, level milled-out portion in a curved surface of the rim outer side in the area of the edge of the covering sealing element, in order to ensure a level contact between the circumferential edge of the sealing element and the rim base, which increases the reliability of the leak tightness of the sealing element vis-à-vis the rim base.

Over and above this, the recess may be designed in such a way that the sealing element arranged therein is for the most part positioned flat, without any significant elevation in relation to the rim outer side, or in particular positioned flush with the surface of the rim outer side, so that the contour of the sealing element follows the contour of the rim base.

With the flush arrangement in particular, geometrical obstacles and also fissure formation between the tire and the rim base can be completely avoided during pressurised fitting of the tire onto the rim base.

With a particularly advantageous embodiment of the invention, it is provided that the sealing element is designed cap-shaped as a flat sealing cap. The sealing cap, with suitable dimensions, provides an appropriate cavity for the contactless covering of the part of the connecting arrangement that extends across the rim outer side of the rim base. The curved sealing cap can be simply pulled over the part of the connecting arrangement that extends across the rim outer side of the rim base and be glued at the edge to the rim base. The design facilitates the production of a secure and stable seal of the connecting arrangement. The cap-shaped design of the sealing element also increases the pressure resistance in relation to the tire pressure prevailing in the adjacent tire chamber.

In an advantageous alternative embodiment the sealing element is designed as an essentially flat sealing disc. A desired cavity above the part of the connecting arrangement that extends across the rim outer side can be achieved in this design by the contact face of the edge of the sealing disc being arranged above the part of the connecting arrangement that extends across the rim outer side. This can take place e.g. by a corresponding layer height of the glued connection of the edge of the sealing disc to the rim base being created, or by the part of the connecting arrangement that extends across the rim outer side arranged recessed in the rim base.

The level design of the sealing element enables a particularly flat design of the sealing points, which constitutes a further considerable simplification when fitting the tire.

It is particularly advantageous if the sealing cap or the sealing disc is designed to be unsupported. The unsupported sealing cap or sealing disc rests solely on its edge and has such inherent rigidity that it does not deform, or only deforms insignificantly, when the inner pressure of the tire chamber of the wheel rim is exerted on it. Thereby, on the one hand, a seal that spans the connecting arrangement in a contactless manner long term is ensured which is fully decoupled from the micro-movements of the connecting element and the other connecting components, e.g. the bushing component. On the other hand, a deformation-free contact between the edge of the unsupported sealing cap or sealing disc and the rim base is ensured, which safeguards the leak tightness of the sealing cap or sealing disc in relation to the rim base.

A constructively advantageous embodiment provides that the sealing cap or the sealing disc has a web structure for support on the part of the connecting arrangement that extends on the rim outer side.

With this embodiment, the sealing cap or sealing disc can for example be supported by the bushing component, the flange collar of the bushing component and/or by the connecting element of the connecting arrangement. The supporting web structure makes it possible to design the sealing cap or the sealing disc with thinner walls, which contributes to weight-saving.

In accordance with a further favourable design, a flexible supporting body for supporting the sealing cap or sealing disc is provided on the part of the connecting arrangement that extends on the rim outer side. The flexible supporting body consists of a flexible, rubbery material, preferably on the basis of polyurethane.

The sealing cap or the sealing disc lies loosely on the flexible supporting body, which is placed or glued onto the part of the connecting arrangement that extends on the rim outer side. This design likewise makes it possible to design the sealing cap or the sealing disc with thinner walls and thereby weight-reduced.

If the supporting body is, in particular, arranged centrically, an optimum distribution of load and/or pressure over the surface of the sealing cap or sealing disc is achieved, whereby its wall thickness minimization can be optimized.

With a particularly flat design of the supporting body and/or an arrangement of the supporting body in the recessed tool contact of the head of the connecting element, a mostly flat design or arrangement of the sealing cap or sealing disc is enabled, which provides the previously described advantages when it comes to the mounting of the tires.

Furthermore, for the purposes of support, the sealing cap or the sealing disc may have a flexible filling layer on a side that is facing the rim outer side.

If the filling layer fills the cavity that is formed above the part of the connecting arrangement on the rim outer side under the sealing cap or the sealing disc, this assists with all-over, flexible support of the sealing cap or the sealing disc on the part of the connecting arrangement that extends on the rim outer side.

The filling layer can be designed as an internal coating of the sealing cap or of the sealing disc or as an independent filling layer between the sealing cap or the sealing disc and the part of the connecting arrangement that extends on the rim outer side of the rim base. Preferably a flexible adhesive is used for the filling layer that ensures sufficient decoupling of the sealing cap or of the sealing disc from the micro-movements of the connecting element and the other connecting components e.g. the bushing component. With this design, a high stability of the seal in relation to the internal pressure of the tire chamber of the wheel rim is achieved, which permits an even thinner-walled design of the sealing cap or the sealing disc.

In a further advantageous embodiment, it is provided that an inner bushing component of the connecting arrangement has a flange collar that extends across the rim inner side of the rim base.

The lower flange collar of the inner bushing component that contacts with the rim inner side improves the introduction of force and distribution of contact pressure of the wheel disc against the rim base made of fiber composite material and hence offers greater protection of the fiber structure of the rim base when subjected to the continuous load of the mechanical connection with, in particular, metallic wheel discs. In the area of the connecting arrangement, the forces are introduced over an even larger area into the fiber composite structure.

In this context it is also advantageous if this flange collar has a corresponding connecting surface for the seating of a connecting surface of the wheel disc, so that the bushing component is available as a robust friction partner with a large-area frictional connection for connecting the wheel disc, which protects the rim base made of fiber composite material even better in the area of the connecting arrangement.

Further advantages result if the flange collar of the inner bushing component has a protrusion above the contour of the rim inner side of the rim base. Thus the wheel disc is solely in contact with the bushing component, whereby, during operation of the vehicle wheel, direct vibratory-rubbing wear between the wheel disc and the rim base is completely avoided.

A constructively favourable embodiment provides that several bushing components of a connecting arrangement are arranged to as to be interlocking with one another. In this way, the passage through the rim base made of fiber composite material is completely lined by the bushing components and the fiber composite material of the rim base protected in the passage. The interaction of the interlocking bushing components also compensates even better for the relative movements of the mechanical connection arising during operation of the vehicle wheel. The vibratory-rubbing wear between the connecting element and the fiber structure of the rim base is significantly reduced as a result, which, alongside the high leak tightness that is ensured, further improves the operational reliability of the connecting arrangement.

In addition, the interlocking bushing components can generate comprehensive galvanic shielding of the rim base vis-à-vis the wheel disc and the connecting element which, particularly when using metallic wheel discs, prevents the appearance of contact corrosion.

These and other features apparent from the patent claims, the description of the embodiments and the drawings can, in each case either for themselves or in combination, be put into practice as advantageous embodiments of the invention for which protection is being claimed here.

BRIEF DESCRIPTION OF THE DRAWINGS

The device according to the invention shall be explained in more detail using the following embodiments. The associated drawings show, in a schematic representation, the following.

DETAILED DESCRIPTION OF EMBODIMENTS

Figure 1:
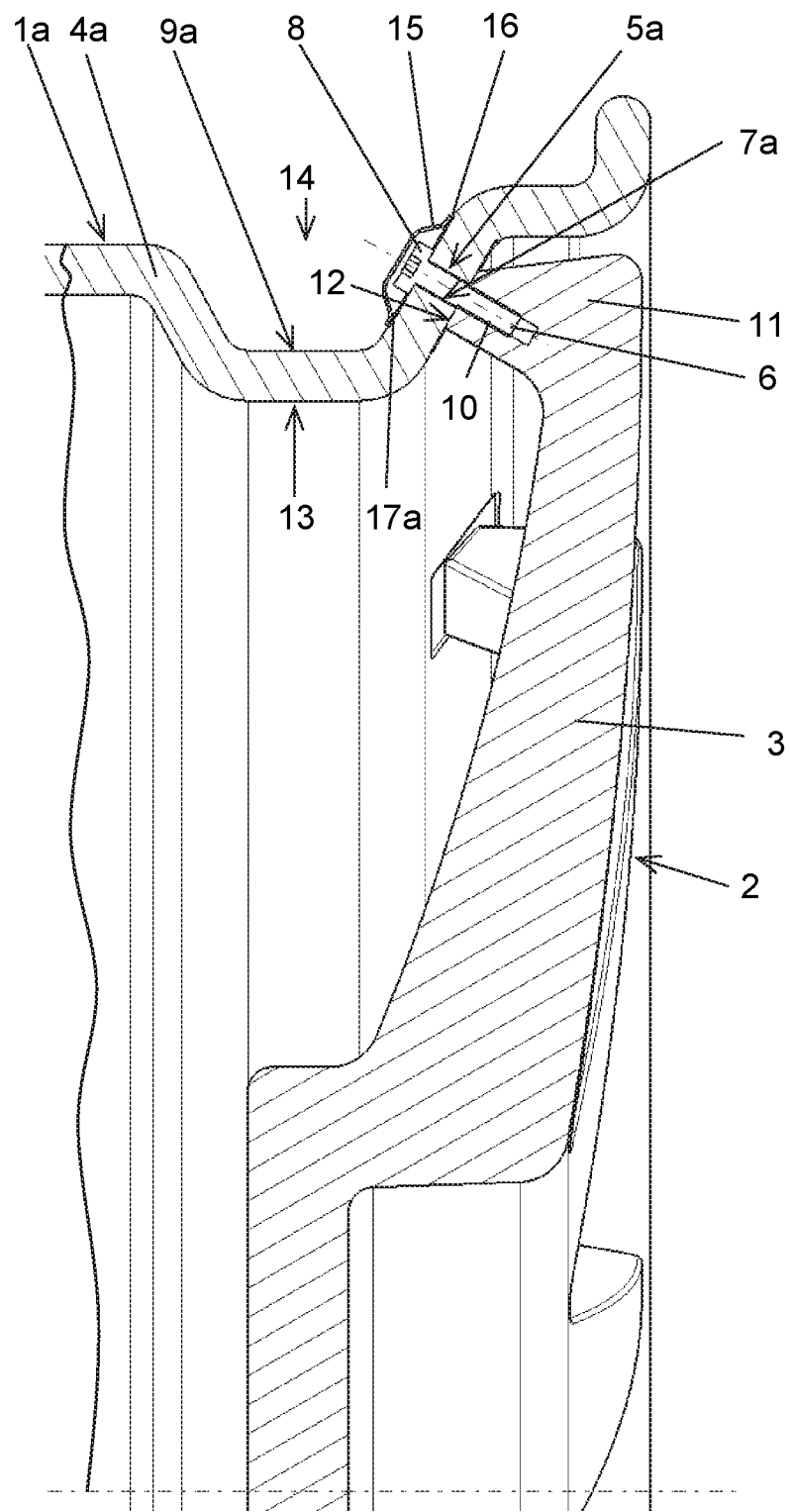
FIG. 1 is a partial cross-sectional view of a vehicle wheel according to the invention with a wheel rim, a star-shaped wheel disc and several connecting arrangements each with one connecting bolt, covered by an unsupported sealing cap.

FIG. 1 shows a section of a vehicle wheel with a wheel rim 1a and a star-shaped wheel disc 2 with a spoke unit 3 made of stainless steel. The wheel rim 1a has a rim base 4a made of carbon fiber-reinforced plastic (CRP), which is particularly reinforced with carbon nanotubes.

The wheel disc 2 is screwed firmly to the wheel rim 1a by means of several connecting arrangements 5a provided in a number corresponding to the number of spokes 3, consisting of, in each case, a flat headed connecting bolt 6. The flat headed connecting bolts 6 made of stainless steel are in each case guided through a clearance hole 7a of the rim base 4, whereby a flat head 8 of the connecting bolt 6 extends on the rim outer side 9a of the wheel rim 1a and is flush with the rim base 4a, whilst a threaded shaft 10 of the connecting bolt 6 engages in each case with one spoke end 11 of the wheel disc 2. In the firmly bolted state, the front faces 12 of the spoke ends 11 are in contact with a rim inner side 13 of the wheel rim 1a, in each case flush with the rim base 4.

On the rim outer side 9a, a tire chamber 14 of the wheel rim 1a that is only shown in outline is attached, which is bounded by a tire (not shown) which sits on the wheel rim 1a. Thereby the connecting arrangement 5a is concealed in the mounted state of the vehicle wheel and not visible from outside.

A sealing element 15 in the form of an unsupported sealing cap 15 covers—in a hollow manner—the bolt head 8 that extends on the rim outer side 9a completely without contacting it. On a flanged edge 16 the sealing cap 15 is glued in an air-tight manner to the rim base 4a by means of an adhesive bond 17a that goes all the way round.

The curved sealing cap 15 made of stainless steel has sufficient inherent rigidity which ensures the dimensional stability of the sealing cap 15 even under the prevailing tire pressure of the attached tire chamber 14, measuring up to 8 bar, and prevents direct contact with the bolt head 8.

By means of the inherently stable sealing cap 15 that is glued on the edge side, the tire chamber 14 is fully sealed off in relation to the clearance hole 7 of the rim base 4a and connecting bolt 6, and thereby sealed off from the external atmosphere.

If the connecting arrangement 5a is located in an area of the rim base 4a with a curved surface of the rim outer side 9a, preferably at least the contact face of the sealing cap 15 is milled level so that the circumferential edge 16 of the sealing cap 15 optimally contacts with the rim base 4a. The level, planar milled-out portion may also extend across the entire covering area of the sealing element, in this case of sealing cap 15, so that even the part of the connecting arrangement 5a that extends to and on the rim outer side 9a has a planar arrangement on the rim base 4a, as is visible in the FIGS. 1 to 9.

The sealing cap 15 is outside of the force-fit contact pressure of the connecting bolt 6 against the rim base and the wheel disc 2 and is fully decoupled from the relative movements appearing during operation of the vehicle wheel between the wheel disc 2, the connecting bolt 6 and the rim base 4.

The sealing cap 15 and its glued connection 17a are not subjected to the mechanical stress of the force-fit connecting arrangement 5a and are protected from creep movements and vibratory-rubbing wear. The sealing effect of the connecting arrangement 5a is thereby secured long term.

At the same time, the rim base 4a reinforced particularly with carbon nanotubes sufficiently withstands the mechanical loads in the connecting arrangement 5a so that, as a result, a reliable and operationally safe connecting arrangement with a functionally secure seal is achieved for connecting the wheel rim 1 to the wheel disc 2.

Figure 2:
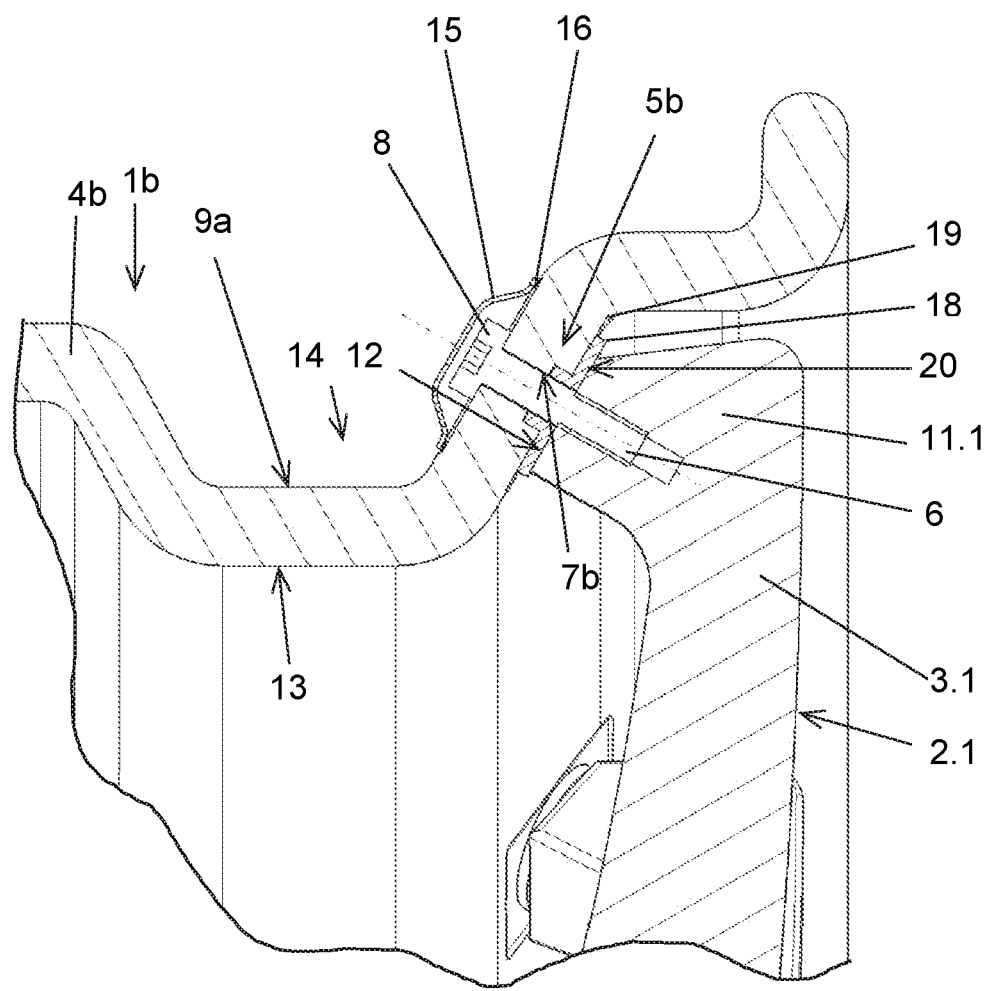
FIG. 2 is a partial cross-sectional view of the vehicle wheel in accordance with FIG. 1 with several connecting arrangements each with one connecting bolt and one bushing component, covered by an unsupported sealing cap.

FIG. 2 depicts a section of a vehicle wheel with a wheel rim 1b and a star-shaped wheel disc 2.1 with a spoke unit 3.1, which are connected to each other by means of several connecting arrangements 5b provided in a number corresponding to the number of spokes 3.1. The rim base 4b of the wheel rim 1b consists, as with the embodiment in accordance with FIG. 1, of CRP, which is particularly reinforced with carbon nanotubes. The wheel disc 2.1 is manufactured from aluminium.

In the following, essentially only the differences vis-à-vis the embodiment in accordance with FIG. 1 shall be described. The same components are given the same reference symbols.

In a further difference vis-à-vis the design in accordance with FIG. 1, the relevant connecting arrangement 5b consists, in addition to the flat headed connecting bolt 6 made of stainless steel, of an inner insertable bushing component 18 made of stainless steel, which viewed from the rim inner side 13 is arranged in the clearance holes 7b of the rim base 4b and has a flange collar 19 that extends across the rim inner side 13 of the wheel rim 1b. A shaft of the insertable bushing component 18 is set in a planar manner into the clearance hole 7b. The insertable bushing component 18 partially lines the clearance hole 7b and lines the peripheral area of the rim base 4b that extends on the rim inner side 13.

The connecting bolt 6 is guided flush through the clearance hole 7b and the inner insertable bushing component 18, whereby the flat bolt head 8 sits flush with the rim outer side 9a of the wheel rim 1b and the threaded shaft 10 engages in each case with one spoke end 11.1 of the wheel disc 2.1.

Each flange collar 19 has a certain wall thickness with which it extends into the inner rim cavity of the wheel rim 1b and has a protrusion above the inner contour of the rim base 4b. On each of the flange collars 19, a connecting surface 20 is constructed for the corresponding seating of, in each case, the front face 12 of the spoke ends 11.1 of the wheel disc 2.1. The connecting surface 20 forms, during operation of the vehicle wheel, a solid friction partner for the front faces 12 of the spoke ends 11.1 of the wheel disc 2.1.

The micro-movements occurring with this design of the connecting arrangement 5c during the operation of the vehicle wheel do not exert any direct vibratory-rubbing wear between the fiber structure of the rim base 4b and the sharp-edged front face 12 of the aluminium wheel disc 2.1, and bring about less vibratory-rubbing wear between the fiber structure of the rim base 4b and the connecting bolt 6.

This is all the more advantageous since the relative movements resulting from the elasticity of the wheel disc 2.1 made of aluminium are significantly stronger than with a relatively more rigid wheel disc made of stainless steel in accordance with FIG. 1. Through the additional insertable bushing component 18, the operational safety of the connecting arrangement 5b can be further improved.

In the same manner as the sealing element 15 in accordance with FIG. 1, the unsupported sealing cap 15 made of stainless steel completely covers the bolt head 8 that extends on the rim outer side 9a, without contacting it (the bolt head) in the process. On the flanged edge 16, the sealing cap 15 is glued in an air-tight manner to the rim base 4b by means of a glued connection 17a that goes all the way round.

With this sealing cap 15, the same advantages are achieved as with the embodiment in accordance with FIG. 1. Seals of the bushing component 18 against the rim base 4b and the wheel disc 2.1 are not required.

Figure 3:
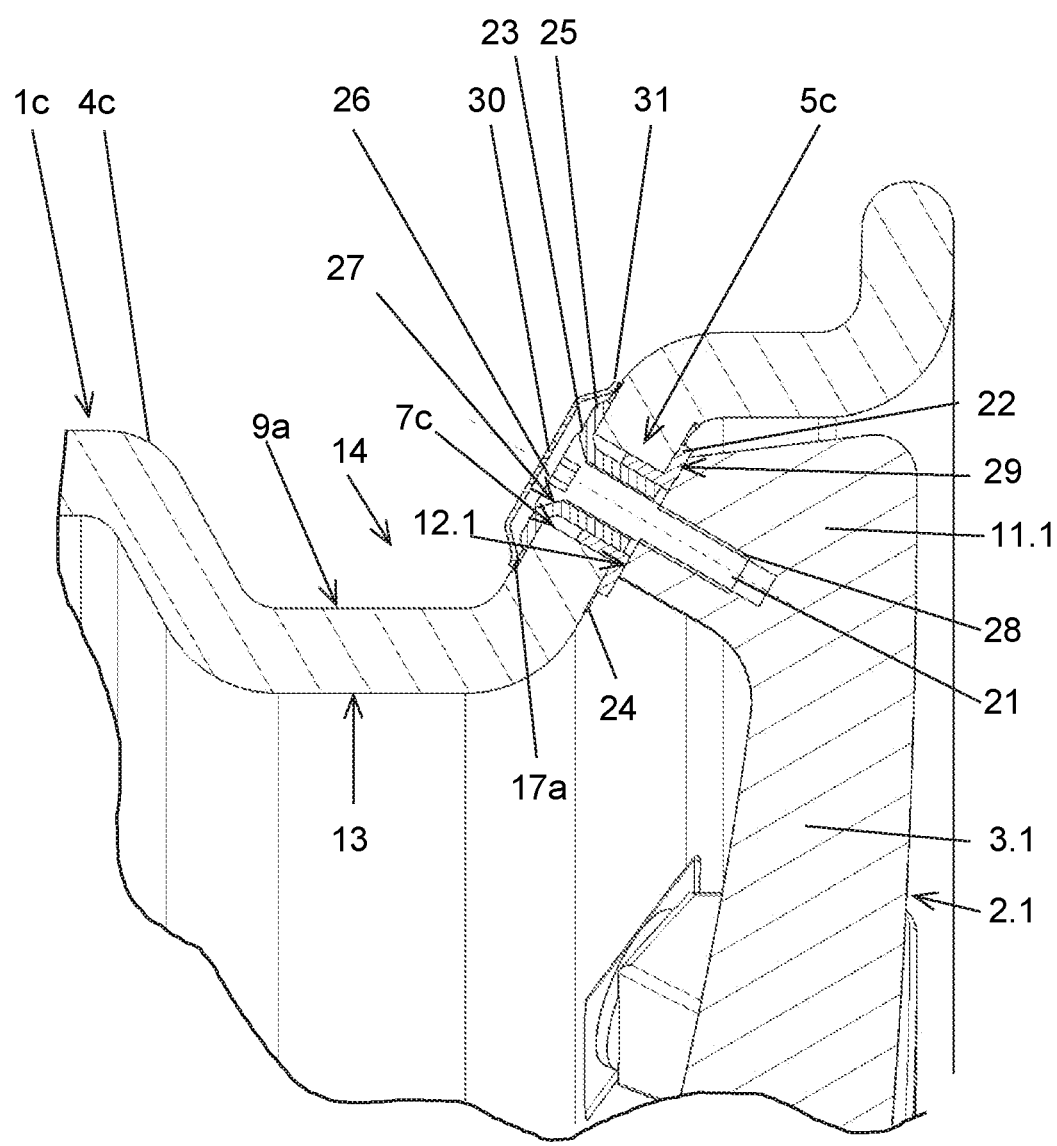
FIG. 3 is a partial cross-sectional view of the vehicle wheel in accordance with FIG. 1 with several connecting arrangements each with one connecting bolt and two bushing components, covered by an unsupported sealing cap.

FIG. 3 shows, unlike the design in accordance with FIG. 2, the section of a wheel where a wheel rim 1c with a rim base 4c made of glass fiber-reinforced plastic (GRP) and a star-shaped wheel disc 2.1 with a spoke unit 3.1 made of aluminium are connected to each other by means of several connecting arrangements 5c whose number corresponds to the number of spokes 3.1.

In the following, essentially only the differences vis-à-vis the embodiment in accordance with FIG. 2 are described. The same components are given the same reference numbers. The connecting arrangement 5c consists in each case of a countersunk head connecting bolt 21 made of steel and an inner bushing component 22 and outer bushing component 23 made of steel, which, viewed from the rim inner side 13 or from the rim outer side 9a, are inserted in the clearance hole 7c of the rim base 4c and are arranged so as to be interlocking. The inner bushing component 22 has a flange collar 24, similar to the flange collar 19 of the insertable bushing component 18 in accordance with the design in FIG. 2, which extends across the rim inner side 13 of the wheel rim 1c, whilst the outer bushing component 23 has a flange collar 25 that extends across the rim outer side 9a of the wheel rim 1c.

The countersunk head connecting bolt 21 is guided through the clearance hole 7c with the inserted outer and inner bushing component 22, 23, whereby the tapered countersunk head 26 of the countersunk head connecting bolt 21 sits flush on a tapered contact surface 27 of a tapered section of the outer bushing component 23, and the threaded shaft 28 engages with in each case one spoke end 11.1 of the wheel disc 2.1.

On each flange collar 24 of the inner bushing components 22, which have a protrusion above the inner contour of the rim base 4c, a connecting surface 29 is constructed for the corresponding seating of in each case the front face 12 of the spoke ends 11.1 of the wheel disc 2.1. The connecting surface 29 forms—in the same way as the connecting surface 20 of the flange collar 19 of the insertable bushing component 18 in accordance with the design in FIG. 2—a solid friction partner for the front faces 12 of the spoke ends 11.1 of the wheel disc 2.1, without contacting the rim base 4c. Both bushing components 22, 23 line both the entire clearance hole 7c and the peripheral area that extends on the rim outer side 9a and the peripheral area that extends on the rim inner side 13.

In this design of the connecting arrangement 5c the micro-movements arising during operation of the vehicle wheel do not exert any direct vibratory-rubbing wear between the fiber structure of the rim base 4c, the countersunk head-connecting bolt 21 and the wheel disc 2.1. The connecting arrangement 5c extensively protects, in particular, the rim base 4c made of relatively soft GRP.

The interlocking arrangement of the bushing components 22, 23 can also compensate for the relative movements within the connecting arrangement 5c and further reduce the vibratory-rubbing wear.

This is all the more advantageous since the relative movements resulting from the elasticity of the wheel disc 2.1 made of aluminium are significantly stronger than with a relatively more rigid wheel disc 2 made of stainless steel in accordance with FIG. 1.

Through the use of the bushing system made of two interlocking bushing components 22, 23, the operational safety of the connecting arrangement 5c is improved further.

The reliable leak tightness of the connecting arrangement 5c is achieved through an unsupported, inherently stable sealing cap 30 made of steel which completely covers the bolt head 26 of the countersunk head connecting bolt 21 and the flange collar 25 of the outer bushing component 23, without contacting these parts of the connecting arrangement 5c. A flanged edge 31 of the sealing cap 30 is, in the peripheral area around the outer flange collar 23 that extends on the rim outer side 9a, in contact with the rim base 4c and is glued in an airtight manner to the rim base 4c by means of a glued connection 17a that goes all the way round.

Preferably, the area of the covering sealing cap 30 has a planar milled-out portion in the curved surface of the rim outer side 9a, as a result of which the part of the connecting arrangement 5c that extends on the rim outer side and the circumferential edge 31 of the sealing cap 30 are optimally in contact with the rim base 4c.

Thereby complete sealing of the connecting arrangement 5c against the air pressure of the tire chamber 14 is achieved, whereby, thanks to the external position and dimensionally stable design of the sealing cap 30, the sealing effect remains preserved long term for the connecting arrangement.

In addition to improving the operational safety of the connecting arrangement 5c through the bushing system 22, 23, with this sealing cap 30 the same advantages concerning the sealing effect are brought about as with the embodiments in accordance with FIGS. 1 and 2. Seals between the bushing components 22, 23 and against the rim base 4c and the wheel disc 2.1 are not required.

Figure 4:
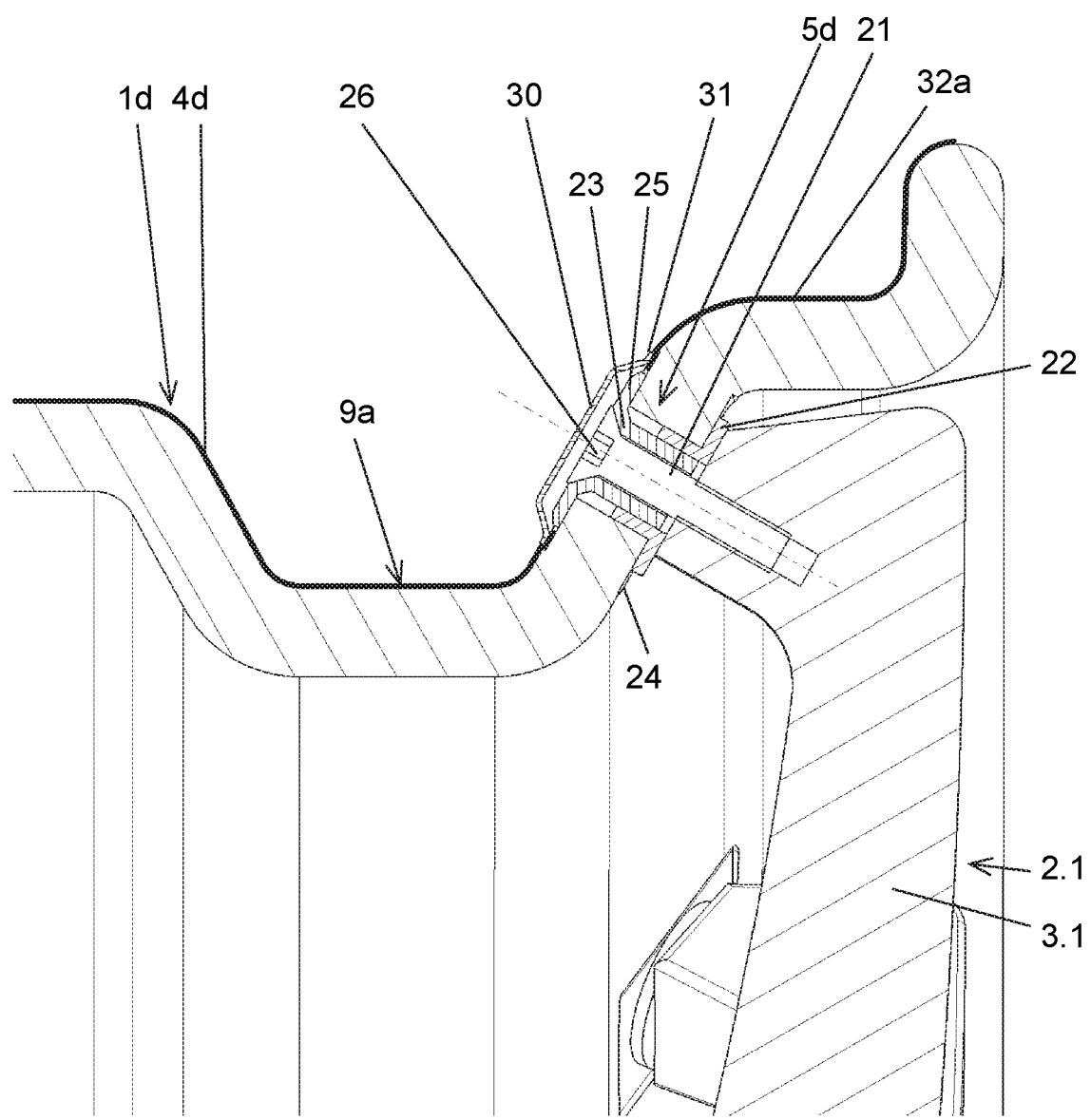
FIG. 4 is a partial cross-sectional view of the vehicle wheel in accordance with FIG. 1 with several connecting arrangements each with one connection bolt and two bushing components, covered by an unsupported sealing cap on a coating layer.

FIG. 4 shows, in the same way as the view in accordance with FIG. 3, a section of a wheel in which a wheel rim 1d with a rim base 4d made of GRP and a star-shaped wheel disc 2.1 with a spoke unit 3.1 made of aluminium are connected to each other by means of the connecting arrangements 5d in accordance with FIG. 3.

In the following, essentially only the differences vis-à-vis the embodiment in accordance with FIG. 3 are described. The same components are given the same reference symbols.

Unlike the design in accordance with FIG. 3, the rim base 4d has a viscoplastic coating layer 32a, which is applied on the rim outer side 9a of the rim base 4d to increase the airtightness of the fiber composite material of the rim base. The coating layer 32a can be formed for example by powder coating with viscoplastic plastic granulate. The coating layer 32a made of viscoplastic plastic surrounds, in each case, the flange collar 25 of the outer bushing component 23 of the connecting arrangement 5d that extends on the rim outer side 9a. The unsupported, inherently stable sealing cap 30 made of steel, which completely covers the bolt head 26 of the countersunk head connecting bolt 21 and the flange collar 25, is placed on the viscoplastic coating layer 32 and its edge 31 glued in an air-tight manner to the coating layer 32a in the peripheral area around the flange collar 25. The coating layer 32a, which is normally used to seal the rim base 4d, is very suitable as an elastic sealant and adhesive for the fixing and air-tight gluing of the sealing caps 30. Gluing with a separate adhesive is not required.

The sealing caps 30 glued to the coating layer 32a complete the air-tight sealing of the rim base 4d, whereby the coating layer 32a in the interior of the sealing cap 30 can be dispensed with. The flange collar 25 of the outer bushing component 23 can be directly supported by the rim base 4d. The coating layer 32a is not in the flow of force from the connecting arrangement 5d, so that disadvantageous creep of the coating layer 32a owing to the micro-movements of the bushing component 23 is ruled out.

Figure 5:
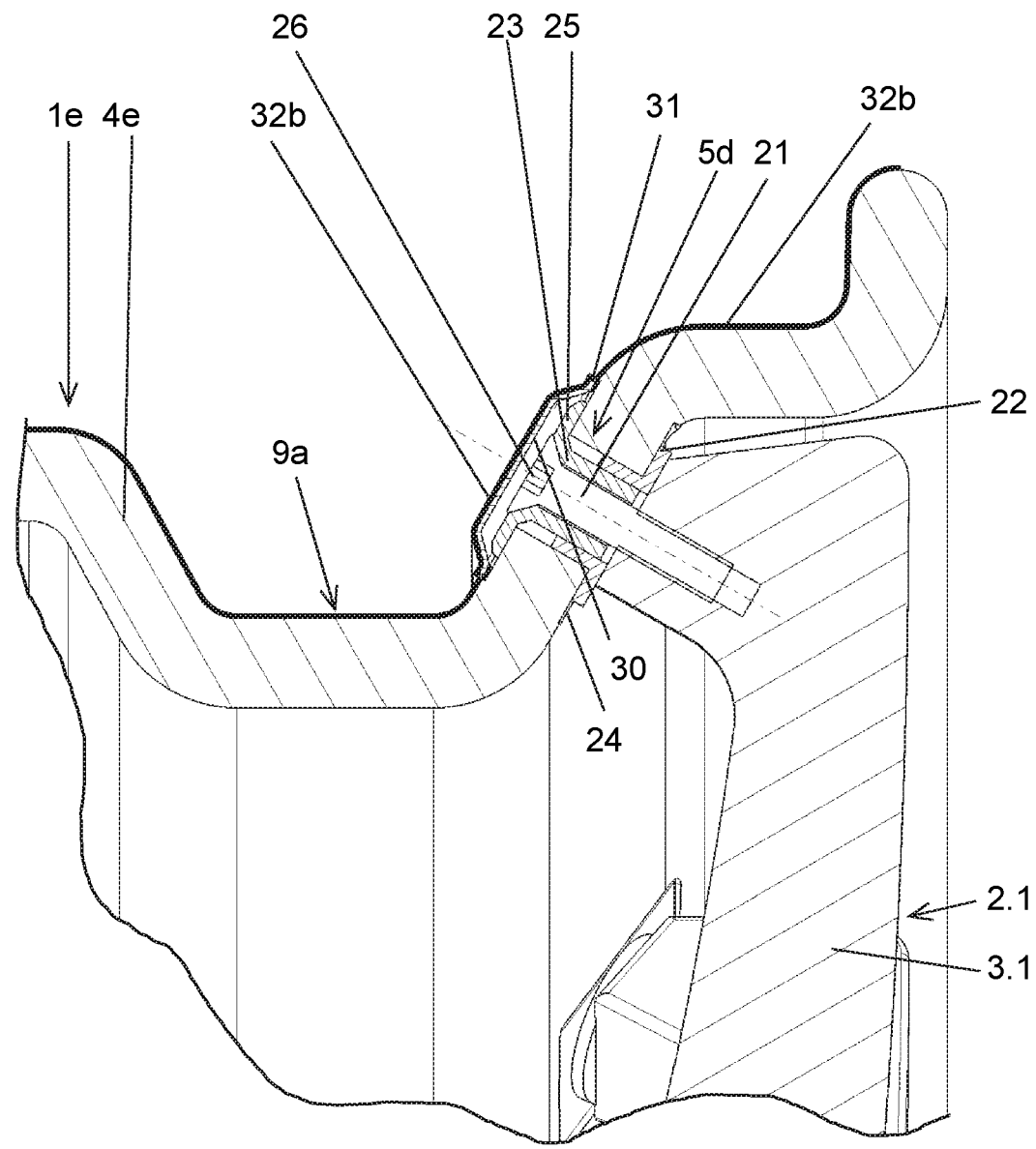
FIG. 5 is a partial cross-sectional view of the vehicle wheel in accordance with FIG. 1 with several connecting arrangements each with one connecting bolt and two bushing components, covered by an unsupported sealing cap under a coating layer.

Visible from FIG. 5 are, in the same way as the view in accordance with FIG. 4, the wheel rim 1e with a rim base 4e made of GRP and the star-shaped wheel disc 2.1 with a spoke unit 3.1 made of aluminium, which are connected to each another by means of the connecting arrangements 5e as per FIG. 3. The rim base 4e is, in order to increase the airtightness of the fiber composite material, coated on the rim outer side 9a with the viscoplastic coating layer 32b.

In the following, essentially only the differences vis-à-vis the embodiment in accordance with FIG. 4 are described. The same components are given the same reference symbols.

Unlike the design in accordance with FIG. 4, the coating layer 32b made of viscoplastic plastic, which assists with the usual sealing of the rim base 4e, is formed continuously across the rim base, whereby the unsupported sealing caps 30 made from steel which are attached to the rim base are covered with the coating layer 32b and at the same time are glued in an air-tight manner to the coating layer 32b on the flanged edge 31.

With this design it is possible, alongside the previously described advantages, to achieve a full all-over airtight seal outside of the connecting arrangement 5e whilst minimizing the production effort, since the air-tight adhesive connections of the sealing caps 30 can be executed at the same time as the production step of coating of the rim base 4e.

Figure 6:
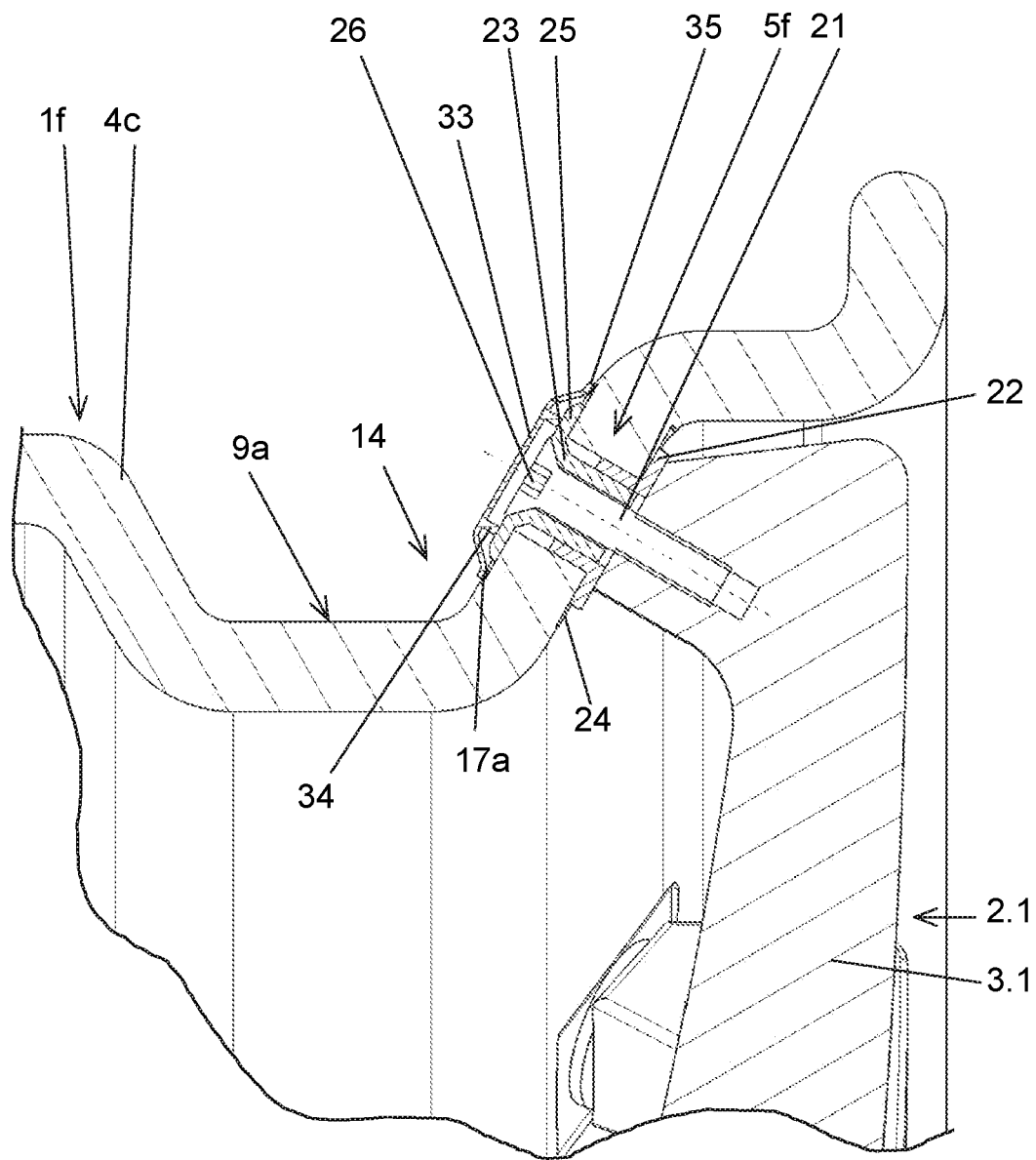
FIG. 6 is a partial cross-sectional view of the vehicle wheel in accordance with FIG. 1 with several connecting arrangements each with one connecting bolt and two bushing components, covered by a sealing cap with a web structure.

In the embodiment in accordance with FIG. 6, a section of a vehicle wheel is shown which has a wheel rim if with a rim base 4c made of CRP and the star-shaped wheel disc 2.1 with the spoke unit 3.1 made of aluminium, which are connected to each other by means of the connecting arrangements 5f in accordance with FIG. 3.

Unlike the previously described designs, the sealing element 33 for the sealing of the connecting arrangement 5f is a sealing cap 33 made of plastic which completely covers the bolt head 26 of the countersunk head connecting bolt 21 and the outer flange collar 25 of the outer bushing component 23 which extends on the rim outer side 9a. The sealing cap 33, which lies in a hollow manner, has a web structure 34 for support in relation to the flange collar 25, without, however, contacting the countersunk head 26.

A flanged edge 35 of the sealing cap 33 contacts with the rim base 4c in the peripheral area around the flange collar 25 and is glued in an air-tight manner by means of a glued connection 17a, going all the way round, to the rim base, in order to seal off the connecting arrangement 5f against the tire chamber.

The web structure 34 gives the relatively thin-walled sealing cap 33 made of plastic sufficient dimensional stability so that the sealing cap 33 does not deform under the prevailing tire pressure of the tire chamber 14 of the wheel rim if and thereby, on the one hand, a sealing connection is ensured long term between the sealing cap 33 and the rim base 4c and on the other hand a direct contact with the countersunk head 26 is avoided.

The web structure 34 is supported in a loose, floating layer by the flange collar 25, so that the outer bushing component 23 can move freely when subjected to the micro-movements arising during the operation of the vehicle wheel and the transmission of vibrations to the sealing cap 33 is mostly decoupled.

This design is particularly suitable for wheel constructions with higher rigidity, as for example are used with sports cars. With these wheel constructions, relative movements in the connecting arrangement occur to a smaller degree owing to a more rigid wheel rim and/or a more rigid wheel disc, so that the impact on the sealing caps 33 that are loosely in contact with the bushing components is correspondingly negligible. In the present embodiment, the wheel disc 2.1 made of aluminium is combined with a wheel rim if that is rigid in nature, whose rim base 4c made of CRP has a large wall thickness and/or the CRP has a high fiber density and/or high-module fibers of high rigidity.

This design of the sealing cap 33 with web structure 34 makes it possible to minimize the wall thickness and the weight of the sealing caps 33, which leads to a weight-saving as far as the wheel construction is concerned, which is significant particularly with sports cars.

Figure 7:
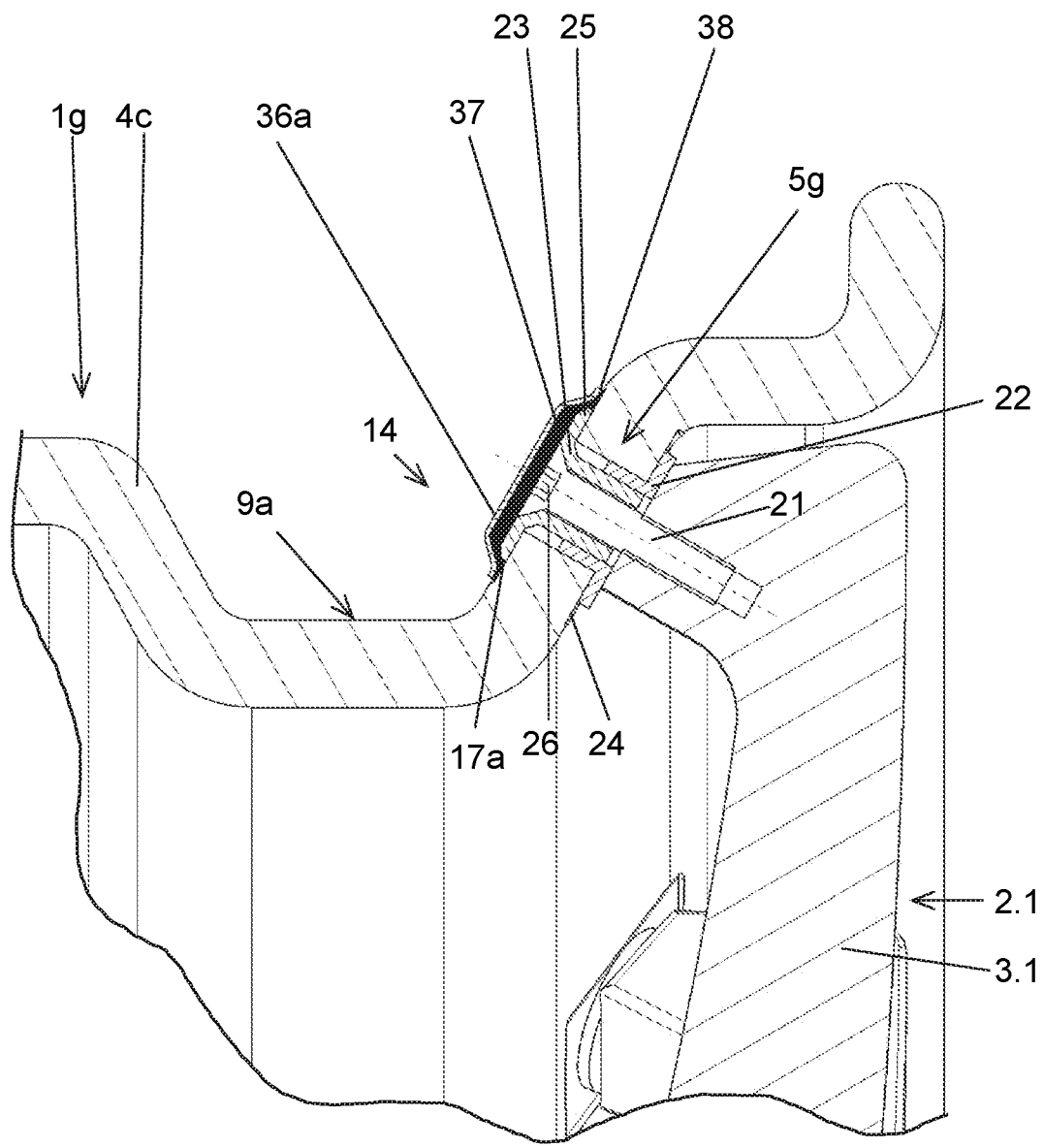
FIG. 7 is a partial cross-sectional view of the vehicle wheel in accordance with FIG. 1 with several connecting arrangements each with one connection bolt and two bushing components, covered by a sealing cap with a flexible filling layer.

FIG. 7 shows a section of a vehicle wheel which, in the same way as the embodiment in accordance with FIG. 6, has a wheel rim 1g with a rim base 4c made of CRP and a star-shaped wheel disc 2.1 with a spoke unit 3.1 made of aluminium, which are connected to each other by means of the connecting arrangements 5g as per the design in accordance with FIG. 3.

In the following, essentially only the differences vis-à-vis the embodiment in accordance with FIG. 6 are described. The same components are given the same reference symbols.

Unlike the sealing of the connecting arrangement 5g in accordance with FIG. 6, the sealing element 36a is a particularly thin-walled sealing cap made of plastic with an internal coating through a filling layer 37. The thin-walled sealing cap 36a completely covers the bolt head 26 of the countersunk head connecting bolt 21 and the flange collar 25 of the outer bushing component 23 that extends on the rim outer side 9a forming a cavity.

The thin-walled sealing cap 36a made of plastic is lined on its internal side, i.e. facing the rim outer side 9a, with the filling layer 37 made of a flexible filler adhesive, whereby in the mounted state the filling layer 37 fills the cavity above the connecting arrangement 5g and contacts with the bolt head 26 and the flange collar 25.

Alternatively, instead of the coating, a separate filling layer or a filling material made of a flexible plastic can be arranged in the cavity between the bolt head 26 and/or the flange collar 25 and the sealing cap 36a.

The preferably uncoated, flanged edge 38 of the sealing cap 36a contacts with the rim base 4c in the peripheral area around the flange collar 25 and is glued in an air-tight manner by means of a firm glued connection 17a, going all the way round, to the rim base 4c, in order to produce the seal of the connecting arrangement 5g vis-à-vis the tire chamber.

The coating 37 of the sealing cap 36a or the intermediate filling layer/filling material 37 on the one hand supports the sealing cap against the tire pressure of the tire chamber 14, so that with this design, too, the wall thickness and the weight of the sealing caps 36a can be reduced to the benefit of a lightweight wheel construction.

The coating 37 of the sealing cap 36a or the intermediate filling layer/filling material 37 generates on the other hand a floating layer on the bolt head 26 and the flange collar 25 so that the countersunk head connecting bolt 21 and the outer bushing component 23 can move freely when subjected to the micro-movements during operation of the vehicle wheel. The vibrations are for the most part decoupled through the flexible filling layer 37 and only transmitted to a small degree to the sealing cap 36a.

This design is likewise suitable for wheel constructions with higher rigidity, as used for example in sports cars.

In the present embodiment, as with the embodiment in accordance with FIG. 6, the wheel disc 2.1 made of aluminium is combined with a wheel rim 1g that is rigid in nature whose rim base 4c made of CRP has a large wall thickness and/or the CRP has a high fiber density and/or high-module fibers of high rigidity. The relative movements occurring to a small extent in the connecting arrangement with these wheel constructions have a negligibly small impact on the flexibly supported sealing cap 36a.

Figure 8:
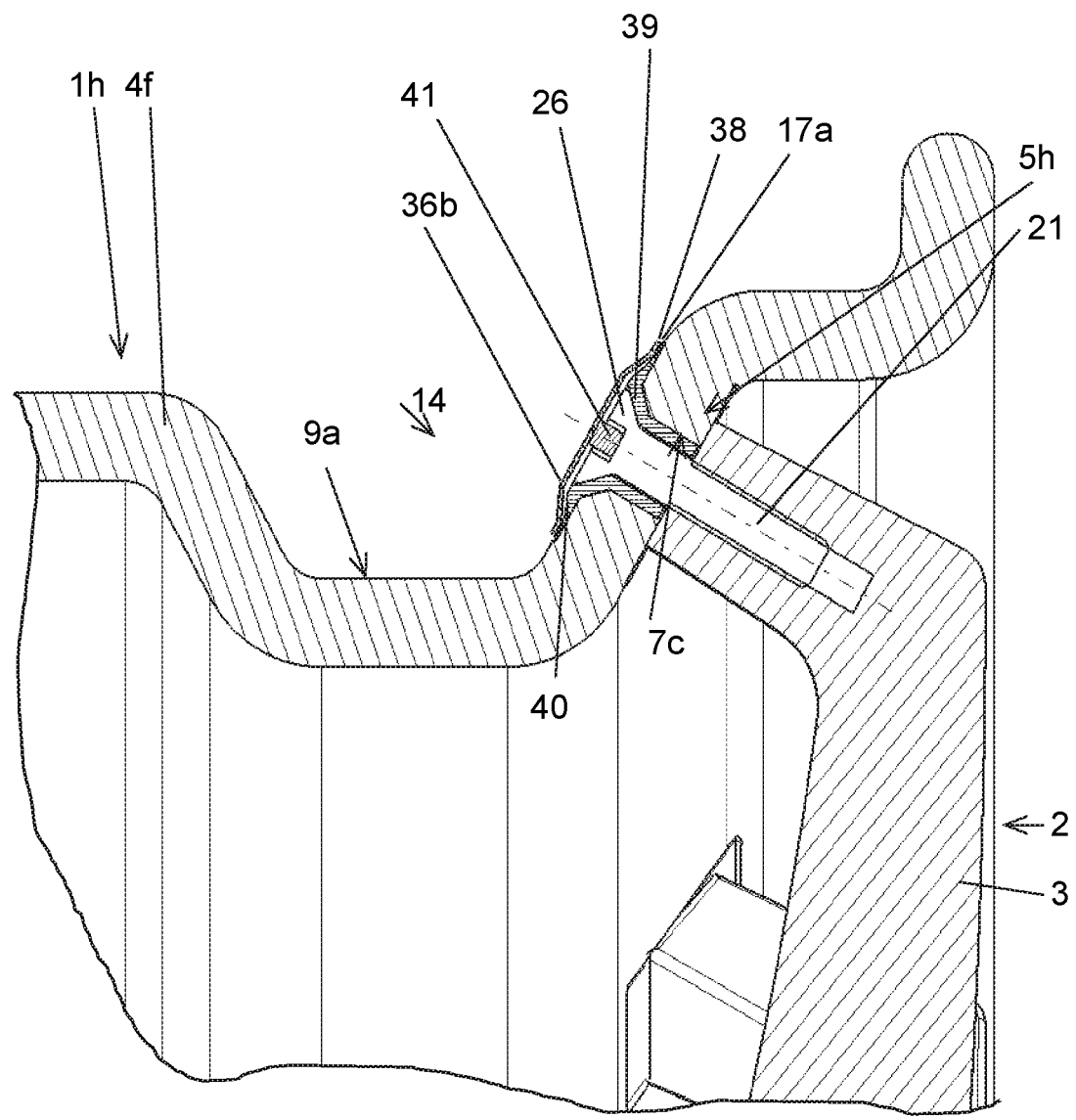
FIG. 8 is a partial cross-sectional view of the vehicle wheel in accordance with FIG. 1 with several connecting arrangements each with one connecting bolt and one bushing component, covered by a sealing cap and a flexible supporting body.

The embodiment in accordance with FIG. 8 likewise concerns a relatively rigid wheel construction corresponding to FIGS. 6 and 7. FIG. 8 shows a section of a vehicle wheel that has a wheel rim 1h with a rim base 4f with a large wall thickness made of CRP and a star-shaped wheel disc 2 made of stainless steel similar to the design in accordance with FIG. 1.

Unlike the designs in accordance with FIGS. 6 and 7, the wheel rim 1h and the wheel disc 2 are connected to one another by means of several connecting arrangements 5h whose number corresponds to the number of spokes 3, which in each case consist of the countersunk head connecting bolt 21 and an outer insertable bushing component 39.

This bushing design is among other things suitable for cases of application in which the direct contact between the wheel disc and the rim base is unproblematic from the perspective of materials technology. The simple one-part, low-mass design offers, alongside weight savings, less effort in terms of manufacture and assembly and thus improves the lightweight construction of the wheel construction at reduced costs.

The outer insertable bushing component 39 is, viewed from the rim outer side 9a, inserted in the clearance hole 7c of the rim base 4f and essentially completely lines the clearance hole. A tapered section of the outer insertable bushing component is set into a correspondingly chamfered recess of the rim base 4f. The outer insertable bushing component 39 has a flange collar 40 that extends across the rim outer side The bolt head 26 of the countersunk head connecting bolt 21 contacts, in the mounted state, in a planar manner with the contact surface of the tapered section of the outer insertable bushing component 39.

The tapered section and the flange collar 40 of the outer insertable bushing component 39 assist with better distribution of the contact pressure in the connecting arrangement 5h during operation of the vehicle wheel.

In order to seal the connecting arrangement 5h, the thin-walled sealing cap 36b made of plastic covers the bolt head 26 of the countersunk head connecting bolt 21 and the flange collar 40 of the outer insertable bushing component 39 that extends on the rim outer side 9a, whereby this forms a cavity above the part of the connecting arrangement 5h that extends on the rim outer side. In the peripheral area around the flange collar 40, the edge 38 of the sealing cap 36b is glued in an air-tight manner to the rim base 4f by means of a glued connection 17a that goes all the way round. The glued connection 17a may be positioned on the rim outer side 9a or on a planar milled-out portion in the curved surface of the rim outer side of the rim base 4f, which is preferably provided in the area of the covering sealing cap 36b, as a result of which the part of the connecting arrangement 5h that extends on the rim outer side and the circumferential edge 38 of the sealing cap optimally contacts with the rim base.

FIG. 8 shows an alternative design for the support of the hollow-lying sealing cap 36b, which is provided here by a flexible supporting body 41, which supports the sealing cap in relation to the bolt head 26 of the countersunk head-connecting bolt 21. The flexible supporting body 41 made of rubbery elastic material on the basis of polyurethane is produced separately and is inserted prior to mounting of the sealing cap 36 into the cavity of the tool contact in the bolt head 26 or glued in using a flexible adhesive.

The covering, hollow lying sealing cap 36b lies loosely on the flexible supporting body 41. The centrically arranged supporting body 41 supports the sealing cap in the middle, so that an optimum distribution of load and pressure is achieved and thereby the wall thickness of the sealing cap can be further optimised.

The sealing cap 36b is, through its loose, floating position, for the most part decoupled from the supporting body 41 and from the bolt head 26. Through the loose positioning and the rubbery elastic nature of the supporting body 41, the micro-movements of the connecting arrangement 5h are only transmitted to a negligibly small degree to the sealing cap 36b. At most, insignificant signs of friction arise between bolt head 26 and supporting structure 41 and between supporting body 41 and sealing cap 36b.

The supporting body 41 which is sunk into the cavity of the bolt head 26 permits what for the most part is a flat design of the sealing cap 36b with a slight elevation above the contour of the rim base 4.2.

Over and above this, for the purpose of having a flat design of the seal, the flange collar 40 of the outer insertable bushing component 39 may also be set into a flat recess of the rim outer side 9a of the rim base 4f (not shown). in addition, the glued connection 17a for sealing (off) the sealing cap 36b can be placed sunken in this flat recess (not shown here) of the rim outer side, as a result of which the elevation of the sealing cap above the contour of the rim base 4f is further reduced.

The flat design and arrangement of the covering sealing cap 36b facilitates the fitting of the tire onto the wheel rim, during which the tire must slide along the contour of the rim base over the well shoulder to the tire seating in their flat design, the seals constitute even less of an obstacle when fitting the tire.

This design of the sealing cap 36b supported by the supporting body is likewise suitable for wheel constructions with higher rigidity as used for example in sports cars, since with these wheel constructions the relative movements which occur to a lesser degree in the connecting arrangement have a negligibly small impact on the flexibly supporting sealing caps.

Figure 9:
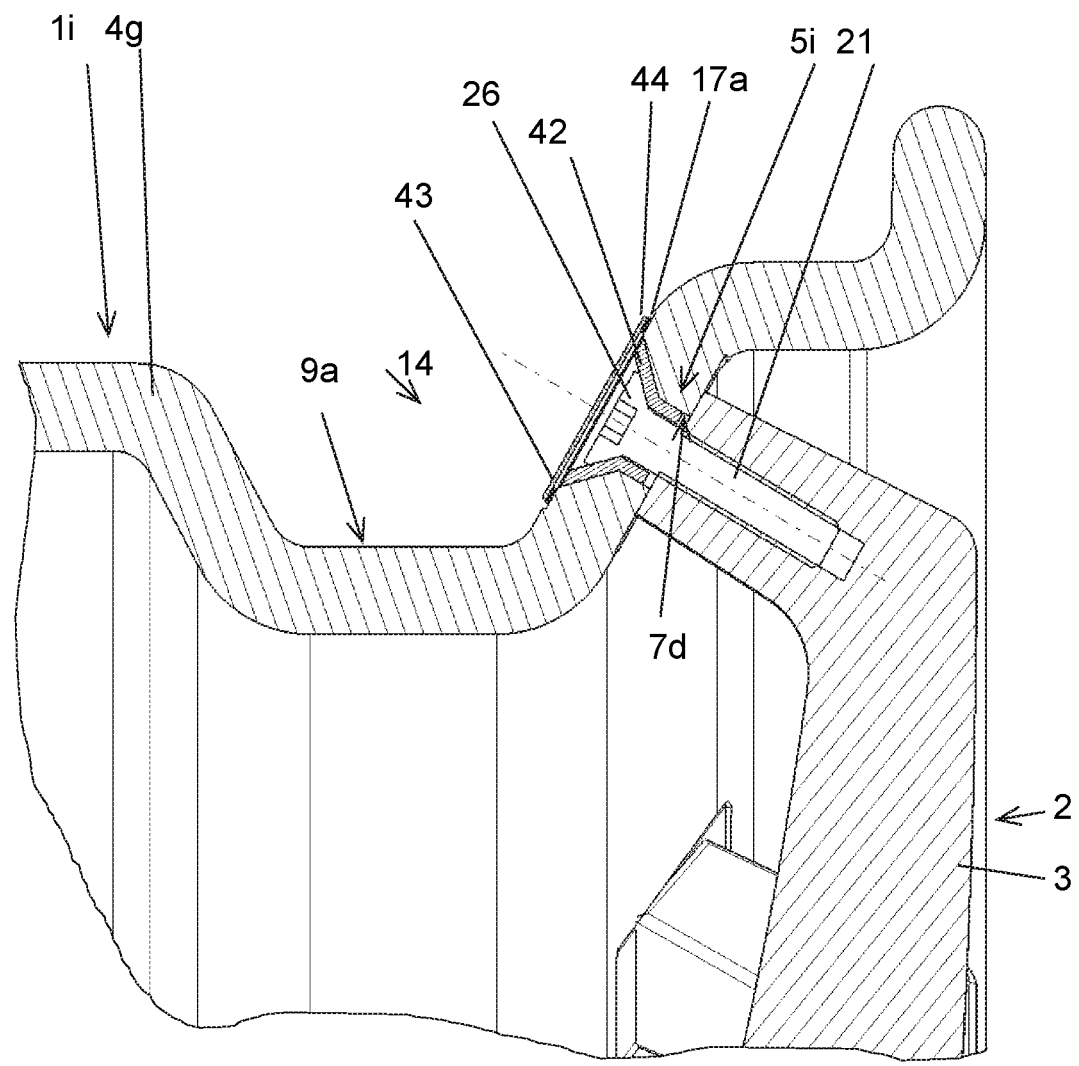
FIG. 9 is a partial cross-sectional view of the vehicle wheel in accordance with FIG. 1 with several connecting arrangements each with one connecting bolt and one bushing component, covered by a sealing disc.

FIG. 9 shows a section of a vehicle wheel which has a wheel rim 1i with a rim base 4g made of GRP and the star-shaped wheel disc 2 with a spoke unit 3 made of stainless steel in the same way as the design in accordance with FIG. 1, which are connected to one another by means of several connecting arrangements 5i in a number corresponding to the number of spokes 3.

The connecting arrangements 5i consist in each case of the countersunk head-connecting bolt 21 and a funnel-shaped, outer insertable bushing component 42 with a pronounced tapered section, which does without a flange collar for the contact pressure.

The funnel-shaped, outer insertable bushing component 42 is arranged in the clearance hole 7 of the rim base 4g and set into a correspondingly chamfered recess of the rim base in such a way that the edge, on the rim outer side, of the funnel-shaped insertable bushing component 42 ends flush with the surface of the rim outer side 9a or with a surface of the level milled-out portion of the rim outer side of the rim base.

The bolt head 26 of the countersunk head-connecting bolt 21 that is screwed into the insertable bushing component 42 is flush with the edge of the funnel-shaped insertable bushing component 42 on the rim outer side or forms, as shown in FIG. 9, preferably a well in relation to the edge, on the rim outer side, of the insertable bushing component 42.

The part of the connecting arrangement 5i that extends across the rim outer side hence continuously does without a protrusion beyond the surface of the rim outer surface 9a, which makes it possible to form a particularly flat covering seal.

The pronounced tapered section of the insertable bushing component 42 ensures particularly good transmission of the contact pressure in the connecting arrangement 5i in relation to the rim base 4g during operation of the vehicle wheel.

In addition, this insertable bushing component 42 is easier to produce compared with a bushing component with a flange collar.

Figure 10:
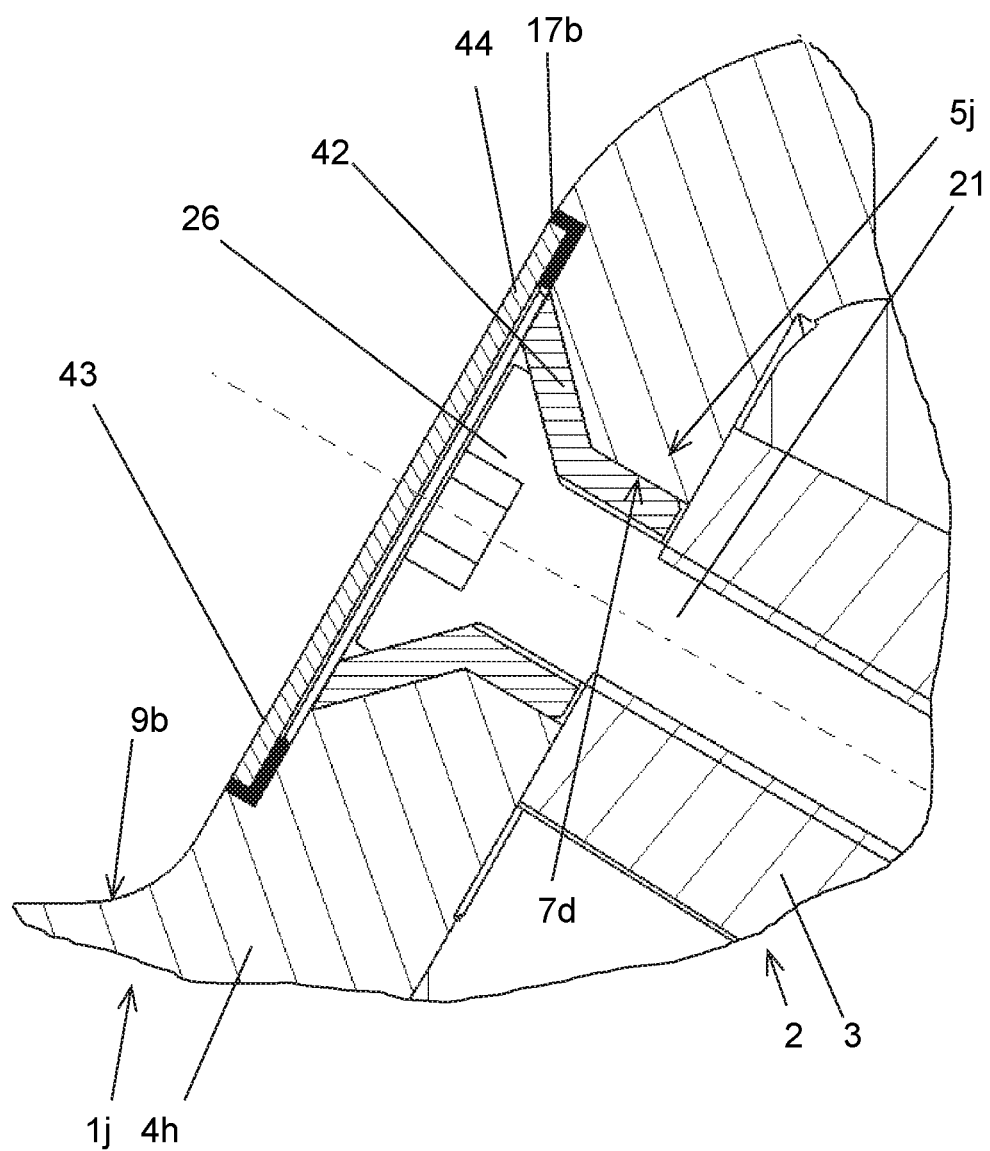
FIG. 10 is a detailed view of the vehicle wheel in accordance with FIG. 9; the bushing component covered with a sealing disc flush with the rim base.

A further advantage is produced with a recessed arrangement of the connecting arrangement 5i in the rim base 4g as per FIG. 10, since the tapered recess to be provided for the funnel-shaped insertable bushing component 42 can for the most part be designed homogeneous and in particular no separate recess must be prepared for a flange collar.

For the sealing of the connecting arrangement 5i in accordance with FIG. 9, an unsupported sealing disc 43 of level design made of thin-walled steel sheet is provided which spans the bolt head 26 of the countersunk head connecting bolt 21 and the edge—on the rim outer side—of the funnel-shaped insertable bushing component 42 in a hollow manner without contacting these parts.

The unsupported sealing disc 43 made of steel sheet has sufficient inherent rigidity to withstand the accumulating pressures in the neighboring tire chamber 14 and not to become deformed.

In the peripheral area around the funnel-shaped insertable bushing component 42, a circumferential edge 44 of the sealing disc 43 is glued in an air-tight manner to the rim base 4.1 by means of a glued connection 17a. The glued connection 17a can be placed on the rim outer side 9a or on the level milled-out portion of the rim outer side of the rim base 4.1.

With the aid of a minimal layer height of the glued connection 17a, as shown in FIG. 9 the unsupported, level sealing disc 43 can extend in a hollow manner across the part of the connecting arrangement 5i arranged flush on the rim outer side—without being in direct contact with the part of the connecting arrangement on the rim outer side.

In an interaction between the flush arrangement of the part of the connecting arrangement 5i on the rim outer side and the level geometry of the sealing disc 43, the covering seal of the connecting arrangement can be designed to be even more flat. The elevations of the seal above the surface of the rim outer side 9a of the rim base 4g are significantly less pronounced, which further facilitates the tire mounting. The mechanical obstacles during tire fitting along the rim base 4g are, for the most part, minimised. The gaps appearing between the rim base 4g and the tire edge, as a result of the high points of the seal, through which, during pressurised tire fitting, air can escape from the tire interior 14 in an undesired manner, are significantly reduced.

In addition, the level sealing disc 43 can be produced very easily.

Unlike the design in accordance with FIG. 9, with the design in accordance with FIG. 10, instead of a planar milled-out portion for the level connection of the funnel-shaped insertable bushing component 42 and for the level contact, all the way round, between the edge 44 of the sealing disc 43 and the rim outer side 9b, a flat recess of the rim outer side of the rim base 4h is provided on which on the one hand the outer, funnel-shaped bushing component 42 terminates and in which, on the other hand, the flat sealing disc 43 is arranged recessed.

The recess is, as shown in FIG. 10, constructed in such a way that the sealing disc 43 embedded in the glued connection 17b on the peripheral edge maintains a cavity from the covered part of the connecting arrangement 5j and is flush with the surface of the rim outer side 9b, so that the outer contour of the sealing disc 43 for the most part follows the shape of the contour of the rim base.

With this design, no edges or elevations are produced in relation to the contour of the rim base 4h, so that during tire mounting, fitting obstacles and unwanted pressure loss resulting from the seal points are completely excluded.

Figure 11:
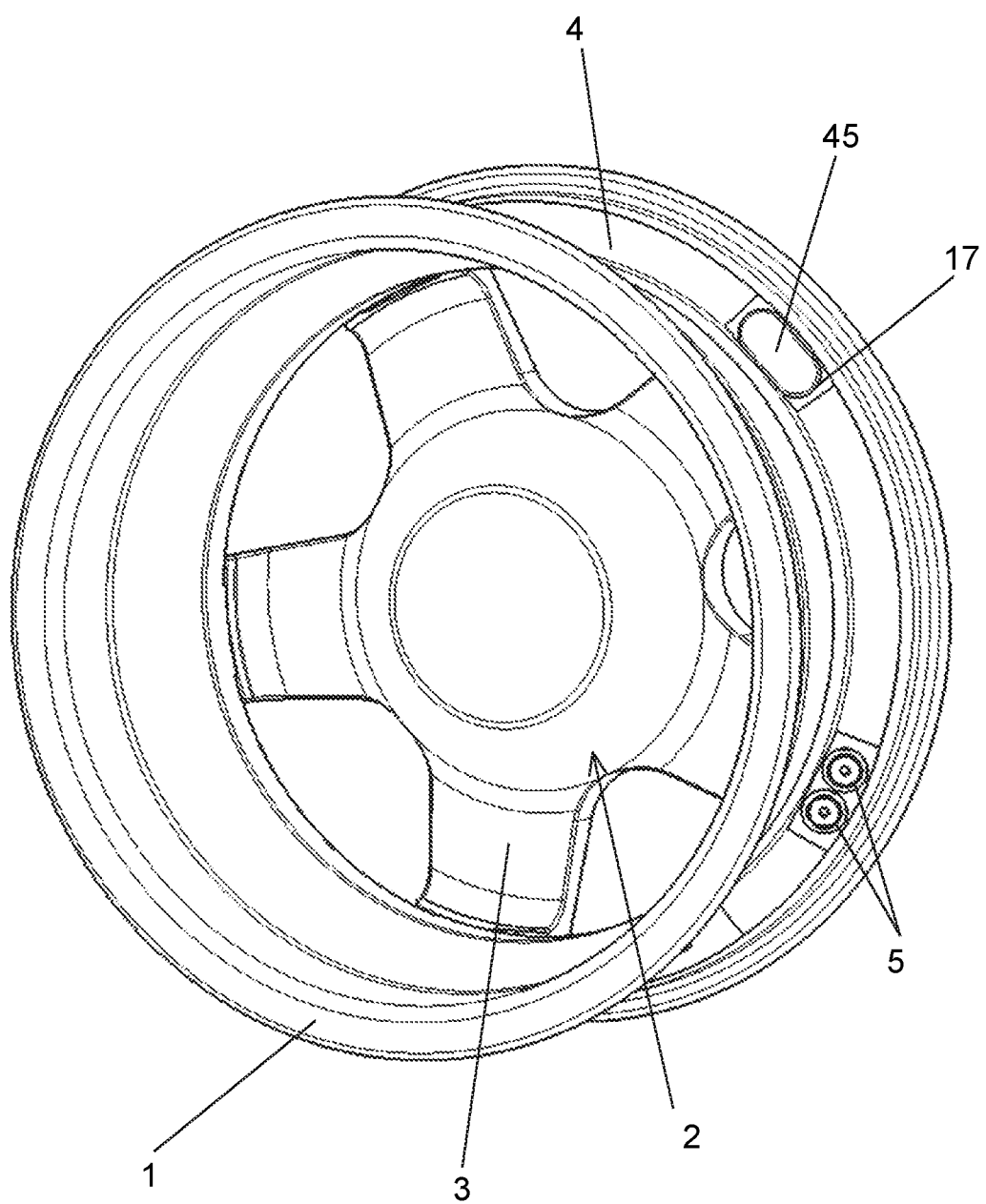
FIG. 11 is an isometric view of the vehicle wheel in accordance with FIG. 1 with several connecting arrangements each with two adjacent connecting bolts per spoke, covered by a collective sealing disc or sealing cap.

FIG. 11 shows a vehicle wheel according to the invention which, corresponding to the embodiments described above, have any type of wheel rim 1, with a rim base 4 and any type of star-shaped wheel disc 2 with a spoke unit 3, which are connected with several connecting arrangements 5 of any of the type disclosed herein. It will be understood that the wheel of FIG. 11 may be constructed according to any of the variations of structural elements disclosed herein.

With special wheel designs, e.g. with a vehicle wheel with a spoke unit with a low number of spokes or particularly broad spokes, as depicted, it may be advantageous, in order to ensure optimum transmission of force from the wheel disc 2 into the rim base 4, to execute several connecting arrangements 5 so as to be grouped and engaging with a spoke.

In this embodiment, for the connection of the wheel disc 2 to the rim base 4, in each case two of the connecting arrangements 5 are arranged to be closely adjacent and engage with one and the same spoke 3. Thereby, relative to the number of spokes 3, double the number of connecting arrangements 5 provided.

The connecting arrangements 5 which in each case are arranged adjacently in groups of two are in each case covered collectively by a single flat, ovally extending sealing cap 45 or any disclosed sealing disc.

The oval sealing cap 45 completely covers, in a hollow manner, the parts of the connecting arrangements 5 that extend across the rim outer side 9 (see above) and is glued in an air-tight manner to the rim base 4 in the surrounding peripheral area of the grouped connecting arrangements 5, in each case by means of a glued connection 17a going all the way round.

A level milled-out portion of the curved rim outer side 9 (see above) extends across the entire area of the covering, oval sealing cap 45, so that in addition to the parts of the connecting arrangements 5 that extend on the rim outer side 4, the oval sealing cap 45 also contacts in a planar manner with the rim base 4 and reliably seals the connecting arrangement 5 against the rim base 4.

The oval sealing cap 45 which covers several connecting arrangements generates, where there is little installation space, a sufficiently large sealing surface with the previously described seal advantages.

This design of the seal also leads to a low number of elevations in relation to the surface of the rim base 4 or to a low number of gaps between the tire edge of the tire to be fitted and the surface of the rim base 4, which likewise facilitates the mounting of the tire.

Figure 12:
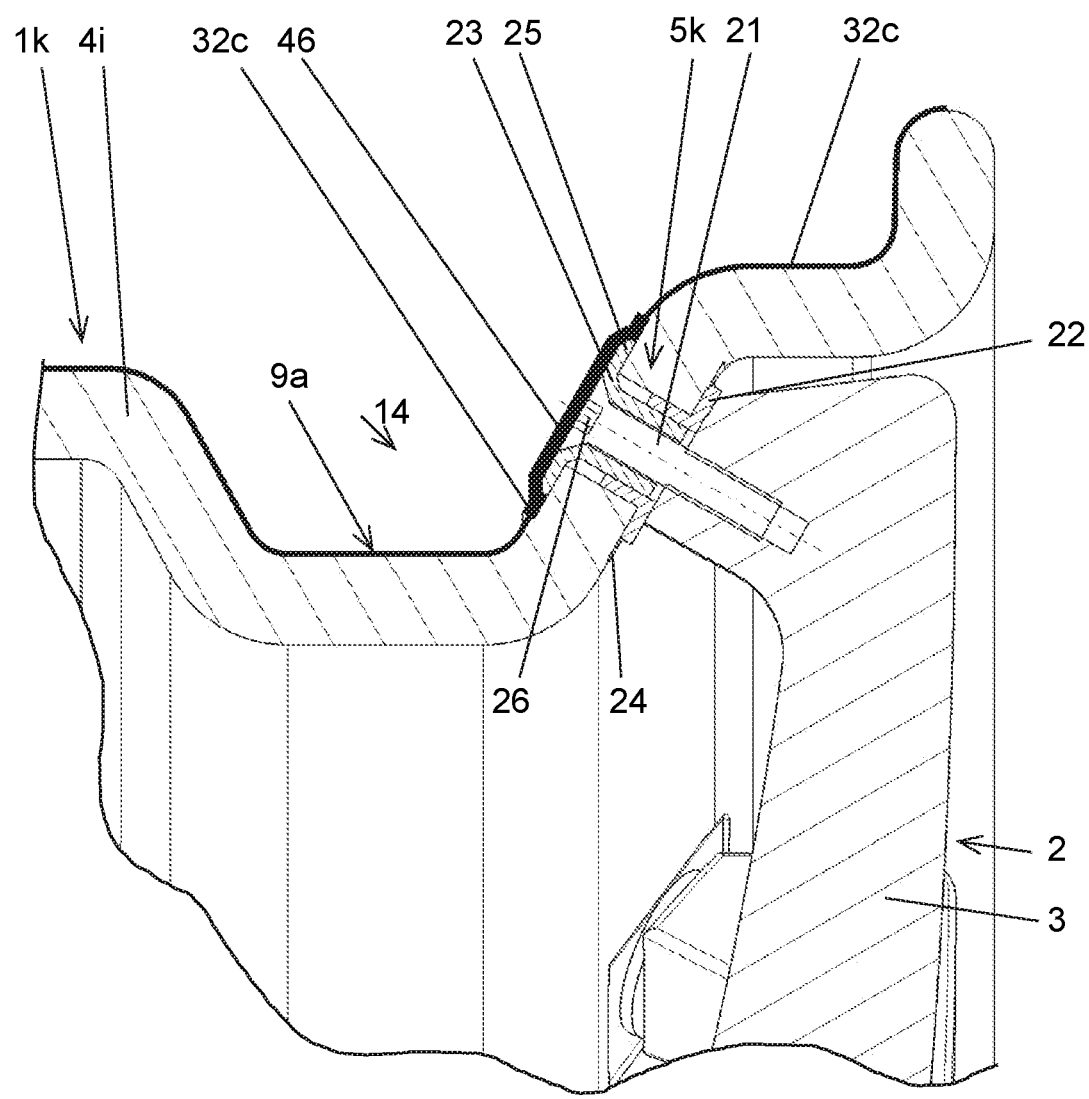
FIG. 12 is a partial cross-sectional view of the vehicle wheel in accordance with FIG. 1 with several connecting arrangements each with one connecting bolt and two bushing components and a covering coating layer.

In FIG. 12 a section of a vehicle wheel is shown which has a wheel rim 1k with a rim base 4i made of CRP and the star-shaped wheel disc 2 with a spoke unit 3 made of stainless steel similar to the design in accordance with FIG. 1, which are connected to one another by means of connecting arrangements 5k in the same way as the design in accordance with FIG. 3.

The bolt head 26 of the countersunk head-connecting bolt 21 and the flange collar 25 of the outer bushing component 23 is covered with a flexible sealing layer 46, which in the embodiment simultaneously corresponds to that coating layer 32 which is constructed on the rim outer side 9a of the wheel rim 1k to increase the air tightness of the fiber composite material of the rim base 4i The sealing layer 46 or coating layer 32c is applied all over the rim outer side 9a of the rim base 4i and the parts of the connecting arrangement 5k that extend on the rim outer side, whereby the parts of the connecting arrangement that extend on the rim outer side are simultaneously covered and enclosed in an air-tight manner.

The sealing layer 46 or coating layer 32c is preferably constructed thicker in the area of the parts of the connecting arrangement 5k that extend on the rim outer side 9a.

Thereby a rubbery, viscoplastic sealing layer is formed which not only fully seals the parts of the connecting arrangement 5k that extend on the rim outer side 9a against the air pressure of the tire chamber 14 but also is good at absorbing and compensating for the micro-movements of the connecting arrangement arising during the operation of the vehicle wheel without the sealing effect being impaired in any way.

With this design it is possible, alongside the previously described advantageous sealing effect, to achieve a minimisation of the production effort and costs, since no separate sealing element is required for the sealing of the individual or grouped connecting arrangements 5k and the construction of the flexible sealing layer 46 can be carried out in one step with the sealing 32c of the rim base 4i.

This design is particularly suitable for heavy wheel constructions with a high rigidity. With these wheel constructions micro-movements arise to a particularly small degree in the connecting arrangement as a result of a more rigidly constructed wheel rim and a more rigid wheel disc, so that the impact on the covering, flexible sealing layer 46 is correspondingly low and is absorbed well by the latter.

In the present embodiment the wheel disc 2 made of stainless steel which is relatively stiff and heavy in nature is combined with a heavy design of the wheel rim 1k, whose rim base 4i made of CRP has a large wall thickness and/or the CRP has a high fiber thickness and/or high-module fibers of particularly high rigidity.

In an embodiment that is not shown, the flexible sealing layer 46 can also cover a connecting arrangement 5kk or any arrangement disclosed herein. The flexible sealing layer 46 can, here too, also simultaneously be that particular coating layer 32c which is constructed on the rim outer side 9 to increase the air-tightness of the fiber composite material of the rim base 4i.

This design is just as suitable for, in particular, heavy wheel constructions with high rigidity, as previously described, and for wheel constructions whose wheel rims simultaneously have a rim base with a fiber composite material that is low-wear, similar to the rim base in accordance with FIG. 1.

What is claimed is:

1. A vehicle wheel comprising a wheel rim with a rim base of fiber composite material and a wheel disc, wherein the wheel disc is connected by at least one connecting element to the wheel rim, which at least one connecting element is guided through a passage in the rim base and received by the wheel disc, the wheel rim comprising (a) a connecting arrangement which comprises the at least one connecting element or (b) two or more adjacent connecting arrangements (a) and further comprising a sealing element which in a complete and hollow manner covers that part of (a) or (b) which extends across a rim outer side of the rim base, a circumferential edge of the sealing element being glued to the rim base in an air-tight manner.

2. The vehicle wheel of claim 1, wherein the connecting arrangement comprises at least one bushing component in which the connecting element is guided.

3. The vehicle wheel of claim 2, wherein the at least one bushing component comprises an outer bushing component which comprises a flange collar that extends across the rim outer side.

4. The vehicle wheel of claim 3, wherein the outer bushing component or the flange collar comprises a corresponding contact surface for a seating of the connecting element or of that part of the connecting element which extends across the rim outer side.

5. The vehicle wheel of claim 2, wherein an inner bushing component of the connecting arrangement comprises a flange collar that extends across a rim inner side of the rim base.

6. The vehicle wheel of claim 5, wherein the flange collar comprises a corresponding connecting surface for a seating of a connecting surface of the wheel disc.

7. The vehicle wheel of claim 5, wherein the flange collar comprises a protrusion above a contour of the rim inner side of the rim base.

8. The vehicle wheel of claim 2, wherein several bushing components of the connecting arrangement are arranged so as to be interlocking.

9. The vehicle wheel of claim 1, wherein the part of the connecting arrangement that extends across the rim outer side of the rim base is arranged in a recess of the rim outer side of the rim base.

10. The vehicle wheel of claim 1, wherein the sealing element is arranged in a recess of the rim outer side of the rim base.

11. The vehicle wheel of claim 1, wherein the sealing element is present in the form of a sealing cap.

12. The vehicle wheel of claim 11, wherein the sealing cap is self-supporting.

13. The vehicle wheel of claim 11, wherein the sealing cap has a web structure for support on the part of the connecting arrangement that extends on the rim outer side.

14. The vehicle wheel of claim 11, wherein a flexible supporting body for support of the sealing cap is present or the sealing cap is provided on the part of the connecting arrangement that extends on the rim outer side.

15. The vehicle wheel of claim 11, wherein the sealing cap comprises a flexible filling layer on a side facing the rim outer side.

16. The vehicle wheel of claim 1, wherein the sealing element is present in the form of a sealing disc.

17. The vehicle wheel of claim 16, wherein the sealing disc comprises a flexible filling layer on a side facing the rim outer side.

18. A vehicle wheel comprising a wheel rim with a rim base of fiber composite material and a wheel disc, wherein the wheel disc is connected by at least one connecting element to the wheel rim, which at least one connecting element is guided through a passage in the rim base and received by the wheel disc, the wheel rim comprising (a) a connecting arrangement which comprises the at least one connecting element or (b) two or more adjacent connecting arrangements (a); and a flexible sealing layer made of plastic, which completely coats and covers that part of (a) or (b) and extends across a rim outer side of the rim base, a peripheral area of the flexible sealing layer being connected to the rim base in an air-tight manner, wherein the flexible sealing layer is made of viscoplastic plastic.

19. The vehicle wheel of claim 18, wherein the flexible sealing layer simultaneously is a layer that seals the rim base.

* * * * *